(12) United States Patent
Bhangu

(10) Patent No.: US 12,627,585 B2
(45) Date of Patent: May 12, 2026

(54) PROVISIONING NETWORK ENERGY MANAGEMENT IN A TELECOMMUNICATION SYSTEM

(71) Applicant: RAKUTEN SYMPHONY, INC., Tokyo (JP)

(72) Inventor: Manmeet Singh Bhangu, Andaman and Nicobar Islands (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 48 days.

(21) Appl. No.: 18/687,094

(22) PCT Filed: Dec. 11, 2023

(86) PCT No.: PCT/US2023/083298
§ 371 (c)(1),
(2) Date: Feb. 27, 2024

(87) PCT Pub. No.: WO2024/248883
PCT Pub. Date: Dec. 5, 2024

(65) Prior Publication Data
US 2025/0247316 A1 Jul. 31, 2025

(30) Foreign Application Priority Data
May 31, 2023 (IN) .............................. 202341037534

(51) Int. Cl.
| | |
|---|---|
| *H04L 41/0833* | (2022.01) |
| *H04L 41/147* | (2022.01) |
| *H04L 43/0817* | (2022.01) |
| *H04W 24/02* | (2009.01) |
| *H04W 52/02* | (2009.01) |
(Continued)

(52) U.S. Cl.
CPC ...... *H04L 43/0817* (2013.01); *H04L 41/0833* (2013.01); *H04L 41/147* (2013.01)

(58) Field of Classification Search
CPC ............. H04L 43/0817; H04L 41/0833; H04L 41/147; H04L 41/0677; H04L 41/34; H04L 41/0631; H04W 52/0203; H04W 24/02; H04W 24/04
See application file for complete search history.

(56) References Cited

U.S. PATENT DOCUMENTS

| | | | |
|---|---|---|---|
| 2020/0229085 A1* | 7/2020 | Hsu ................... | H04W 52/0209 |
| 2024/0049128 A1* | 2/2024 | Ludwig ............. | H04W 52/0206 |
| 2024/0298225 A1* | 9/2024 | Hyde ................ | H04W 36/0083 |

FOREIGN PATENT DOCUMENTS

WO 2023/069534 A1 4/2023

* cited by examiner

*Primary Examiner* — Kamal M Hossain
(74) *Attorney, Agent, or Firm* — Sughrue Mion, PLLC

(57) ABSTRACT

Example embodiments of the present disclosure are related to provisioning network energy management in a telecommunication system. According to embodiments, an apparatus may include an energy management function (EMF) for a telecommunication network. The apparatus may be configured to execute instructions for implementing the EMF to: receive, from at least one network entity, one or more energy data associated with the at least one network entity; process the one or more energy data to produce a level of energy efficiency associated with the at least one network entity; and perform, based on the level of energy efficiency, one or more operations for managing energy usage of the at least one network entity.

20 Claims, 12 Drawing Sheets

(51) Int. Cl.
  *H04L 41/0631*   (2022.01)
  *H04L 41/0677*   (2022.01)
  *H04L 41/34*    (2022.01)
  *H04W 24/04*   (2009.01)

800

PROVISIONING NETWORK ENERGY MANAGEMENT IN A TELECOMMUNICATION SYSTEM

CROSS REFERENCE TO RELATED APPLICATION

This application is a National Stage of International Application No. PCT/US2023/083298 filed Dec. 11, 2023, claiming priority from Indian Provisional Patent Application No. 202341037534, filed with the Indian Patent Office on May 31, 2023, and entitled "NETWORK ENERGY MANAGEMENT IN 5G ARCHITECTURE", the disclosure of which is incorporated herein by reference in its entirety.

TECHNICAL FIELD

Example embodiments of the present disclosure relate to the provisioning of network energy management in one or more telecommunication systems.

BACKGROUND

The Information and Communication Technology (ICT) industry represents an important energy consumer worldwide. With the advancement and evolvement of the telecommunication systems, and the like, the operations of the telecommunication systems are theoretically and ideally designed to achieve improved energy efficiency and to thereby reduce energy consumption. Nevertheless, with the rapid worldwide commercialization of advanced telecommunication systems (e.g., 5G systems, etc.), the number of devices, equipment, and the like, involved in the telecommunication systems has increased significantly. As a result, huge increases in network entity's density and network traffic are expected to negate the energy-saving capabilities provided by the advanced telecommunication technologies, leading to a net increase in energy consumption in the telecommunication systems.

By way of example, a 5G network system is a dynamic system that consumes energy continually and responds to spikes in network activity. Specifically, a majority of the energy may be consumed by components of a Radio Access Network (RAN), such as antennas, radio units, and base station elements. Each component may have a denser infrastructure than in today's infrastructure, and may facilitate support of increased traffic and operate over more frequency bands, thereby increasing power consumption of base stations. Typically, RAN elements like Massive Multiple-Input Multiple-Output (MIMO) antennas and beamforming also shift and concentrate power consumption in the 5G system. As such, massive MIMO antenna arrays require additional power per sector which also influences energy consumption of the RAN. Moreover, Edge computing and widespread Internet of Things (IoT) adoption have made the increase in energy consumption unavoidable. In addition, core computing, analysis, and storage have contributed to increased energy consumption of 5G networks.

In view of the above, increased energy consumption in the telecommunication networks has raised the importance of energy savings for operators and service providers who already dedicate a considerable portion of their Operational Expense (OPEX) budgets to power.

SUMMARY

Example embodiments of the present disclosure efficiently and effectively facilitate the provisioning of energy management in one or more telecommunication systems.

According to embodiments, an apparatus may include an energy management function (EMF) for a telecommunication network. The apparatus may be configured to execute instructions for implementing the EMF to: receive, from at least one network entity, one or more energy data associated with the at least one network entity; process the one or more energy data to produce a level of energy efficiency associated with the at least one network entity; and perform, based on the level of energy efficiency, one or more operations for managing energy usage of the at least one network entity.

According to embodiments, a method may include: receiving, from at least one network entity, one or more energy data associated with the at least one network entity; processing the one or more energy data to produce a level of energy efficiency associated with the at least one network entity; and performing, based on the level of energy efficiency, one or more operations for managing energy usage of the at least one network entity, wherein the method is implemented by an energy management function (EMF) for a telecommunication network.

According to embodiments, a non-transitory computer-readable recording medium may have recorded thereon instructions for implementing an energy management function (EMF) for a telecommunication network. The instructions may be executable by an apparatus to cause the apparatus to perform a method comprising: receiving, from at least one network entity, one or more energy data associated with the at least one network entity; processing the one or more energy data to produce a level of energy efficiency associated with the at least one network entity; and performing, based on the level of energy efficiency, one or more operations for managing energy usage of the at least one network entity.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
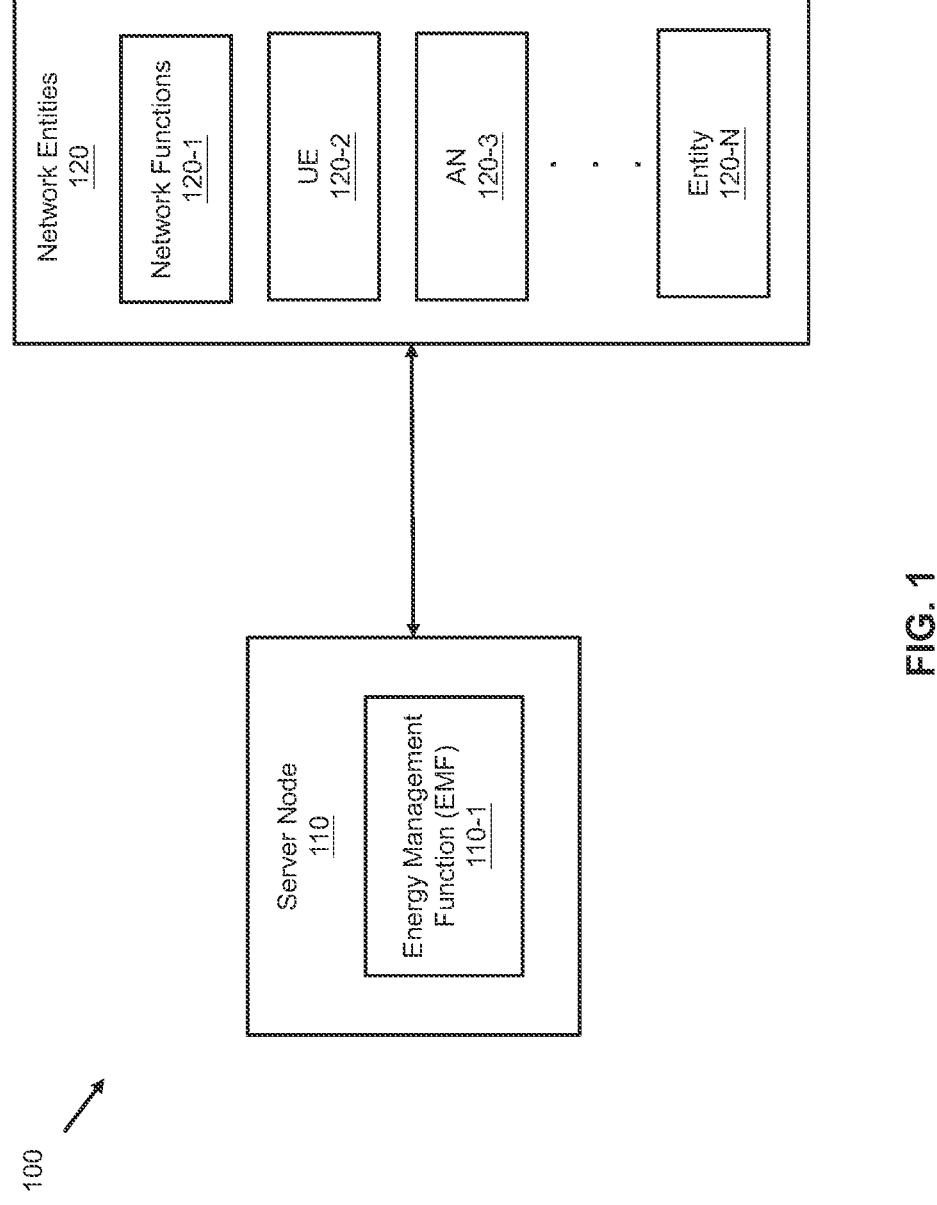
FIG. 1 illustrates a block diagram of a system architecture for provisioning network energy management in a telecommunication system, according to one or more embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]", "at least one of [A] or [B]", or "[A] and/or [B]", are to be understood as including only A, only B, or both A and B.

Further, it can be understood that the terms "telecommunication system", "network system", "telecommunication network system", and the like, described herein refer to the same element, and thus said terms may be used interchangeably herein.

It shall be noted that, for convenience of explanation, the present disclosure may include terms and names defined in one or more standard organizations, such as the 3rd Generation Partnership Project (3GPP) standard organization, the European Telecommunications Standards Institute (ETSI) standard organization, and the like. For instance, the terms "Service-Based Architecture", "Service-Based Interface", "Service-Level Agreement (SLA) criterion", "Non-Public Network (NPN)", "Dedicated Network", "Network Slice", and "Data Network" are to be interpreted as specified by the 3GPP standards and the like.

Furthermore, the terms "energy management", "network energy management", "managing network energy consumption", and the like, as used herein refer to the process of performing one or more operations for managing energy usage of one or more network entities for ensuring energy efficiency in a telecommunication system. More specifically, said terms may refer to the process of effectively managing energy consumption of one or more network entities of the telecommunication system in an optimum manner to provide the same service that could have been provided using a less efficient manner. In general, optimizing energy efficiency may refer to the practice of reducing energy consumption and/or energy requirements while providing services in an efficient or optimal manner. Accordingly, one or more network resources utilized by a network entity may be dynamically adapted to efficiently manage the energy in the telecommunication system.

In related art telecommunications networks, there are no defined and supported energy efficiency criteria as part of standardized communication services to users and application services. That is, specific ways to optimize energy efficiency in advanced telecommunication network systems (e.g., 5G, 6G, etc.) remain unspecified and undefined to date. In view of the above, there is a need for defined system architectures and approaches for provisioning energy management in telecommunication network systems to optimize the energy efficiency of the telecommunication network systems.

Example embodiments of the present disclosure provide system architectures, system configurations, and procedures for efficiently and effectively facilitating the provisioning of network energy management in one or more telecommunication systems.

According to embodiments, a system architecture for implementing energy management functionalities is provided. Specifically, example embodiments of the present disclosure provide an apparatus, such as a server node, that hosts a dedicated energy management function (EMF) (which may also be referred to as "network energy saving function", "NESF", "energy saving function", "ESF", or any other suitable term) for a telecommunication network. The apparatus (e.g., server node) may execute the EMF (or computer-readable instructions for implementing the EMF) to perform one or more operations for provisioning network energy management. For instance, the apparatus (e.g., server node) may, upon executing instructions for implementing the EMF, be configured to: obtain (e.g., via the infrastructure of the telecommunication system) one or more energy data of one or more network entities, process the one or more energy data to obtain useful energy information (e.g., energy consumption of the one or more network entities, level of energy efficiency of the one or more energy entities, etc.), and perform, based on the energy information, one or more operations for managing energy usage of the one or more network entities. Descriptions of example system architecture for implementing the EMF are provided below with reference to FIG. 1.

Since the implementation of EMF in example embodiments of the present disclosure utilizes the infrastructure of the telecommunication system, the existing network infrastructure may be utilized and the cost of implementing and providing network energy management may be minimized. Further, the time for the development and roll-out of new related services may be reduced.

According to embodiments, the apparatus (e.g., server node) may utilize the EMF to interoperate with one or more network functions of the core network (may be referred to as "core network function" herein) of the telecommunication system. The EMF may be hosted or deployed in a server node near the component(s) at which the one or more network functions are deployed, which is typically a server in a regional data center or a server in a central data center. In this case, the EMF may also be deployed as a core network function.

Alternatively, the EMF may be hosted or deployed in a server nearby the end users and/or nearby the network infrastructure at which the energy is provided, consumed, and adjusted. Such server may be located in an edge data center, and thus said server may be referred to as an "edge server" herein. Descriptions of examples of system configuration for implementing the EMF are provided below with reference to FIG. 2 and FIG. 3.

The example embodiments of the present disclosure enable interaction and interoperation among the apparatus (which deploys and utilizes the EMF) and the core network function(s), which may allow efficient communication of the energy data and energy information and may allow the core network function(s) to utilize the energy information to manage energy usage thereof, so as to optimize the energy efficiency of said core network function(s).

According to embodiments, the EMF may be hosted or deployed in a cloud server or a cloud computing environment. Descriptions of an example environment, in which the EMF may be implemented, are provided below with reference to FIG. 4. Further, the EMF may be containerized and deployed in a container-based server. Accordingly, the implementation of EMF in example embodiments of the present disclosure may leverage the advantages of containerization, such as high scalability, reliability, portability, and resource efficiency. Descriptions of examples of apparatuses (e.g., server nodes) in which the EMF may be implemented are provided below with reference to FIG. 5 to FIG. 7. Further, descriptions of example operations that may be performed by the apparatus (e.g., server node) are provided below with reference to FIG. 8, and descriptions of example use cases associated therewith are provided below with reference to FIG. 9 to FIG. 12.

According to embodiments, the implementation of the EMF in terms of reference point representation is provided. Specifically, example embodiments of the present disclosure introduce at least three new reference point representations, each of which may be utilized for communicating with a respective network function(s). The introduction of these new reference points can ensure effective integration and implementation of the EMF into the telecommunication system, but also define its broad-based interaction with the key network functions. Accordingly, the EMF may be utilized by the server node to manage the energy consumption of network entities across the network system, thereby optimizing the energy efficiency across the whole network system.

Ultimately, the example embodiments of the present disclosure provide system architectures, system configurations, and operations for implementing and utilizing energy management functionalities in a telecommunication system, which enable the energy consumption of the network entity(s) in the telecommunication system to be managed effectively and efficiently, thereby optimizing the energy efficiency of the telecommunication system.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations, as well as the technical advantages associated therewith, of example embodiments of the present disclosure are provided below.

General System Architecture

FIG. 1 illustrates a block diagram of a system architecture 100 for provisioning network energy management in a telecommunication system, according to one or more embodiments.

As illustrated in FIG. 1, the system architecture 100 may include at least one server node 110 and a plurality of network entities 120. The at least one server node 110 may be an apparatus, device, or equipment that may be configured to store, host, deploy, and/or utilize at least one energy management function (EMF) 110-1, and may be communicatively coupled to the plurality of network entities 120. The plurality of network entities 120 may include at least one network function 120-1, at least one user equipment (UE) 120-2, at least one access network (AN) 120-3, and any other suitable device, equipment, or system which may contribute to the energy consumption of the telecommunication system. In general, the server node 110 may be configured to execute the EMF 110-1 (or instructions for implementing the EMF 110-1) to provide and perform energy management on at least one network entity of the plurality of network entities 120.

The at least one server node 110 may include one or more apparatuses, such as one or more servers, that may include one or more components (e.g., storage, etc.) configured to store or host the at least one EMF 110-1, and may have one or more components (e.g., processor, etc.) configured to execute or utilize the at least one EMF 110-1 to manage (e.g., receive, store, process, execute, etc.) information, data, tasks, and operations associated with energy. Descriptions of example components that may be included in the server node 110 are provided below with reference to FIG. 6 and FIG. 7, and descriptions of example operations that may be performed by the server node are provided below with reference to FIG. 8 to FIG. 12.

According to embodiments, the at least one server node 110 may include one or more edge servers (may also be referred to as "edge node" herein), which is a server(s) deployed or implemented in one or more edge data centers that located nearby to a target entity(s) or device(s) rather than in a central data center. For instance, the server node 110 may be located or deployed in one or more edge data centers nearby a server node(s) in which the network function 120-1 is deployed, nearby the UE 120-1, nearby the AN 120-3, and/or the like. By implementing the server node(s)

110 (and the EMF 110-1 included therein) on the edge side, the energy management may be performed with reduced latency, which in turn reduces the energy consumption required for performing the energy management and minimizes the effect of the energy management operations on the energy efficiency of the network system.

The energy management function (EMF) 110-1 (which may also be described as Network Energy Saving Function (NESF), Energy Saving Function (ESF), or any other suitable terms) may refer to a dedicated network function for a telecommunication network, and may be responsible to manage energy-related data, information, tasks, and operations in the telecommunication network. Further, the EMF 110-1 may be deployed as a core network function of the telecommunication network. The EMF 110-1 may be defined in software-based forms, such as computer-executable instructions, algorithms, or software application programs. Additionally or alternatively, the EMF 110-1 may be defined in the form of a virtualized network function (vNF), an element of software-defined networking (SDN), and/or the like.

By introducing and implementing EMF 110-1 in the server node 110, the energy management functionalities, operations, and algorithms may be virtualized or defined in software-form, and may be segregated and implemented in different nodes that may be located at different locations. According to embodiments, the EMF 110-1 (or the instructions for implementing the EMF 110-1) may be hosted, deployed, or implemented in a cloud server or a cloud server cluster, such as a hybrid could server/hybrid cloud cluster, and the like.

Alternatively or additionally, the EMF 110-1 may be containerized and be hosted, deployed, or implemented in one or more container-based servers or platforms in the form of containers, pods, and/or microservices. For instance, the server node 110 may include one or more container-based nodes (e.g., Kubernetes (K8s) node, etc.), and the EMF 110-1 may be segregated and be distributed across multiple containers according to, for example, operations and functionalities of the EMF 110-1. By deploying EMF 110-1 as containerized applications, the benefits of containerization, such as high portability, scalability, and resource efficiency, can be leveraged in the implementation of the EMF 110-1.

According to embodiments, the server node 110 may be configured to utilize the EMF 110-1 together with one or more additional network functions (e.g., the network function 120-1, etc.). For instance, the server node 110 may be configured to store/host said one or more additional network functions, and/or may interoperate with one or more equipment/node hosting said one or more additional network functions when required (further described below with reference to the network function 120-1). In some embodiments, the EMF may subscribe to one or more tools of Operations, Administration, and Maintenance (OAM), and may communicate with the one or more OAM tools to obtain energy-related data therefrom.

According to embodiments, the functionalities of the EMF 110-1 may be segregated into a plurality of categories according to network functions. For instance, the functionalities of the EMF 110-1 may be segregated into a first category which is associated with a first network function, and may include a second category which is associated with a second network function.

According to embodiments, the server node 110 may include a plurality of server nodes, and the EMF 110-1 may be hosted or deployed in the plurality of server nodes. In this regard, the EMF 110-1 may be hosted or deployed in the plurality of server nodes according to, for example, the functionality category. For instance, a first portion of the EMF 110-1 which is associated with a first portion of the network functions may be hosted or deployed in a first server node 110, and a second portion of the EMF 110-1 which is associated with a second portion of the network functions may be hosted or deployed in a second server node 110. In some implementations, the first portion of the EMF 110-1 may be hosted or deployed in an edge server, and the second portion of the EMF 110-1 may be hosted or deployed in a central server.

Further, the EMF 110-1 may be hosted or deployed in the plurality of server nodes according to the respective functionality(s). For instance, a portion of the EMF 110-1 which is associated with data computation operations may be hosted in a first portion of the plurality of server nodes, and another portion of the EMF 110-1 which is associated with energy management operations may be hosted in a second portion of the plurality of server nodes.

In view of the above, the virtualization of the energy management functionalities into the EMF 110-1 and the segregation of the functionalities of the EMF 110-1 allow the energy management to be implemented, configured, and provided dynamically and flexibly according to different network configurations and/or network requirements, and at the same time allow centralized management of energy-related data, tasks and information. As a result, the energy management can be implemented and provided easily, flexibly, and optimally.

Referring still to FIG. 1, the network entities 120 may include one or more network functions 120-1, with which the server node 110 may utilize the EMF 110-1 to interoperate. The one or more network functions 120-1 may include one or more network functions of a core network of a telecommunication system, such as an LTE evolved packet core (EPC) network, a 5G core network, a 6G core network, and the like. According to embodiments, the EMF 110-1 may be deployed as a core network function of the telecommunication network, in addition to the one or more network functions 120-1.

As a non-limiting example, the one or more network functions 120-1 may include one or more of: Access and Mobility Management Function (AMF), Session Management Function (SMF), Network Data Analytic Function (NWDAF), Network Repository Function (NRF), Network Exposure Function (NEF), User Plane Function (UPF), Policy Control Function (PCF), Unified Data Management (UDM), Application Function (AF), Network Slice Selection Function (NSSF), Network Slice Specific Authentication and Authorization Function (NSSAAF), Authentication Server Function (AUSF), Policy Control Function (PCF), Unified Data Management (UDM), Service Communication Proxy (SCP), Network Slice Admission Control Function (NSACF), and Edge Application Server Discovery Function (EASDF). One or more of the aforesaid network functions may be defined by or compatible with one or more features and/or requirements specified in one or more specifications provided by the 3GPP standard organization. It can be understood that the one or more network functions 120-1 may further include any other suitable network functions defined in or specified in one or more specifications provided by one or more standard organizations (e.g., 3GPP, ETSI, etc.), without departing from the scope of the present disclosure.

Each of the aforesaid network functions may communicatively couple to the EMF 110-1 via a respective, dedicated interface. For instance, in service-based architecture (SBA), each of said network functions may expose its respective functionalities (e.g., network capabilities, resources, information, etc.) through a dedicated service-based interface (SBI). For instance, the AMF may expose functionalities via Namf interface, the SMF may expose functionalities via Nsmf interface, the NWDAF may expose functionalities via Nnwdaf interface, the NRF may expose functionalities via Nnrf interface, the NEF may expose functionalities via Nnef interface, the PCF may expose functionalities via Npcf interface, the UDM may expose functionalities via Nudm interface, the AF may expose functionalities via Naf interface, the NSSF may expose functionalities via Nnssf interface, the NSSAAF may expose functionalities via Nnssaaf interface, the AUSF may expose functionalities via Nausf interface, the PCF may expose functionalities via Npcf interface, the UDM may expose functionalities via Nudm interface, the SCP may expose functionalities via Nscp interface, the NSACF may expose functionalities via Nnsacf interface, and the EASDF may expose functionalities via Neasdf interface.

In this regard, example embodiments of the present disclosure provide a dedicated SBI "Nemf" for exposing the functionalities of the EMF 110-1 to the network entities in the telecommunication system. Via the Nemf interface, the EMF 110-1 may communicate with other network functions and may interoperate therewith.

In addition to SBI, a portion of the network entities may also communicate via interfaces defined by reference point representations. For instance, the AMF may communicate with the UE 120-2 via N1 interface, the AMF may communicate with the AN 120-3 (e.g., gNodeB, etc.) via N2 interface, the AN may communicate with the UPF via N3 interface, the SMF may communicate with the UPF via N4 interface, the UPF may communicate with a data network (DN) (e.g., any other external or internal networks or service platforms, such as the Internet, the public cloud or private clouds, etc.) via N6 interface, multiple UPFs (e.g., the Intermediate I-UPF and the UPF Session Anchor, etc.) may communicate with each other via N9 interface, and the like. As further described below with reference to FIG. 13, example embodiments of the present disclosure provide at least three new interfaces defined by reference point representations, namely "N110", "N111", and "N112", to communicatively couple the EMF 110-1 to other network entities.

Referring still to FIG. 1, the network entities 120 may include at least one user equipment (UE) 120-2. The UE 120-2 may include one or more equipment, devices, and the like, which may be utilized by one or more network users (e.g., network operators, end users such as network subscribers, etc.) to access the network system via interoperating with other network entities. For example, the UE 120-2 may include one or more of: a computing device (e.g., a desktop computer, a laptop computer, a tablet computer, a handheld computer, a smart device, a server, etc.), a mobile phone (e.g., a smartphone, a radiotelephone, etc.), a wearable device (e.g., a pair of smart glasses or a smart watch), a SIM-based device, and/or any other suitable device or equipment. According to embodiments, the UE 120-2 may include a 3GPP-based UE which may be configured to emit and transmit one or more signals in the form of 3GPP radio signal(s) and/or via one or more 3GPP interfaces.

Further, the network entities 120 may include at least one access network (AN) 120-3. The AN 120-3 may include a radio access network (RAN), which may include at least one base station (e.g., eNodeB, gNodeB, etc.), at least one radio unit (e.g., remote radio unit (RRU), etc.), at least one antenna system (e.g., distributed antenna system (DAS), etc.), at least one radio network controller, and any other suitable components which constitute the RAN.

It is contemplated that the network entities 120 may include any other suitable equipment or devices involved in or associated with the network system, without departing from the scope of the present disclosure. For instance, the network entities 120 may further include one or more equipment or devices constituting a data network (described below with reference to FIG. 10), one or more equipment or devices associated with a trusted third party (described below with reference to FIG. 12), and the like.

Further, it can be understood that the configuration illustrated in FIG. 1 is merely one of the possible embodiments, and the scope of the present disclosure should not be limited thereto. Specifically, the system architecture may include one or more additional component(s), may include fewer component(s) than as illustrated, and may be configured in a manner different from as illustrated.

Figures 2, 3:
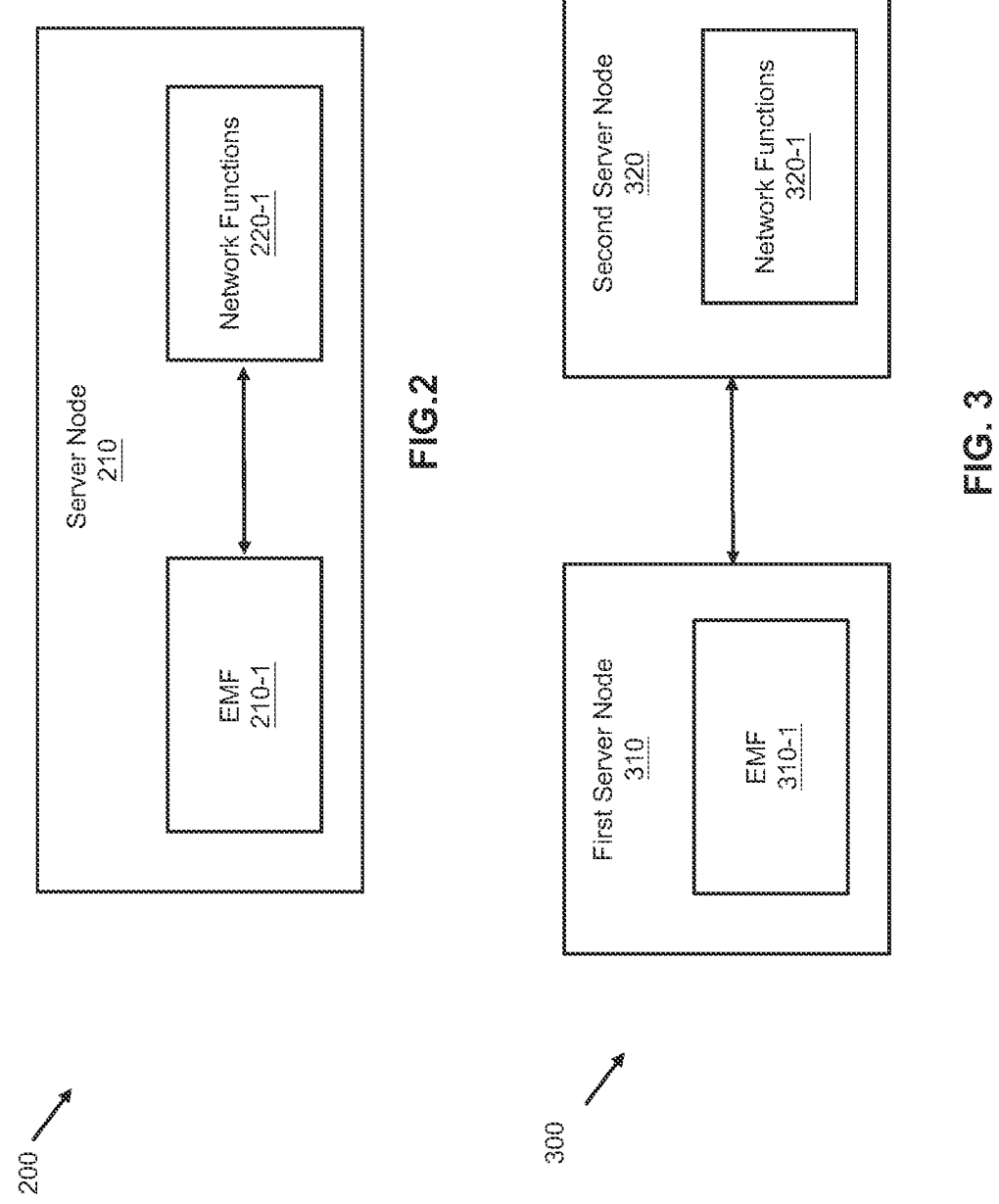
FIG. 2 illustrates a block diagram of an example system configuration for implementing an energy management function (EMF), according to one or more embodiments.
FIG. 3 illustrates a block diagram of another example system configuration for implementing the EMF, according to one or more embodiments.

For instance, FIG. 2 illustrates a block diagram of an example system configuration 200 for implementing the EMF, according to one or more embodiments. The server node 210, the EMF 210-1, and the network function 220-1 in FIG. 2 may be similar to the server node 110, the EMF 110-1, and the network function 120-1 in FIG. 1, respectively.

As illustrated in FIG. 2, the EMF 210-1 and the network function 220-1 may be stored, deployed, hosted, or the like, in the same server node 210. For instance, the server node 210 may include a plurality of storage mediums (e.g., servers, databases, etc.), and the EMF 210-1 may be hosted in a first portion of the server node 210 while the network function 220-1 may be hosted in a second portion of the server node 210. According to embodiments, the server node 210 may include one or more central servers or central nodes.

On the other hand, FIG. 3 illustrates a block diagram of another example system configuration 300 for implementing the EMF, according to one or more embodiments. The first server node 310 and/or the second server node 320 in FIG. 3 may be part of the server node 110 in FIG. 1, and the EMF 310-1 and the network function 320-1 in FIG. 3 may be similar to the EMF 110-1 and the network function 120-2 in FIG. 1, respectively.

As illustrated in FIG. 3, the EMF 310-1 and the network function 320-1 may be stored, deployed, hosted, or the like, in different server nodes. For instance, the first server node 310 hosting the EMF 310-1 may be located at a first geographical location, and the second server node 320 hosting the network function 320-1 may be located at a second geographical location, while the first geographical location may be different from the second geographical location. According to embodiments, the first server node 310 may include one or more edge servers or edge nodes, and the second server node 320 may include one or more central servers or central nodes.

In view of the above, the energy management functionalities may be efficiently and effectively implemented in one or more telecommunication systems. In this way, example embodiments of the present disclosure may effectively and efficiently implement, leverage, and be compatible with the existing network infrastructure to manage the energy usage of one or more network entities, thereby enabling the optimization of energy efficiency with minimal cost, implementation efforts, and the like.

Examples Implementation Environments

As described above, the energy management function (EMF) of example embodiments may be implemented in one or more server nodes. According to embodiments, the server node(s) may include a cloud server or a cloud server cluster, and the EMF may be implemented in a cloud environment.

Figure 4:
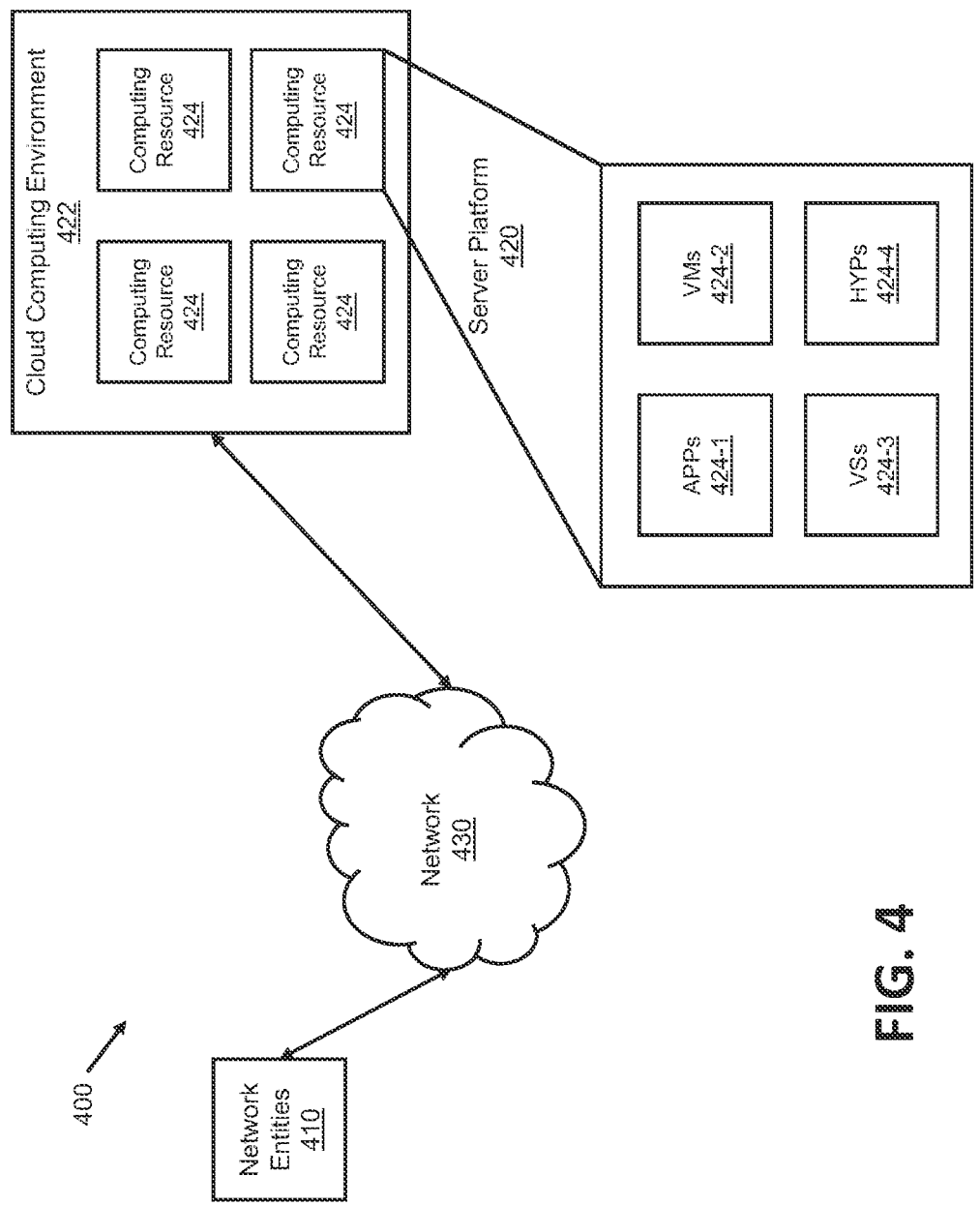
FIG. 4 illustrates a diagram of an example environment in which the EMF described herein, and the systems and/or methods associated therewith, may be implemented.

FIG. 4 illustrates a diagram of an example environment 400 in which the EMF described herein, and the systems and/or methods associated therewith, may be implemented. As shown in FIG. 4, environment 400 may include a plurality of network entities 410, a server platform 420, and a network 430. Devices and components of environment 400 may interconnect via wired connections, wireless connections, or a combination of wired and wireless connections.

The plurality of network entities 410 may include one or more network entities (e.g., network functions, UE, AN, etc.) described above with reference to FIG. 1 to FIG. 3. Thus, redundant descriptions associated therewith may be omitted below for conciseness.

The server platform 420 may include one or more servers capable of receiving, generating, storing, processing, and/or providing information. In some implementations, server platform 420 may include a cloud server or a group of cloud servers. According to embodiments, the server platform 420 may include one or more server nodes described herein. In some implementations, the server platform 420 may be designed to be modular such that certain software components may be swapped in or out depending on a particular need. As such, the server platform 420 may be easily and/or quickly reconfigured for different uses or requirements.

In some implementations, as shown, the server platform 420 may be utilized in or be equipped with a cloud computing environment 422. Notably, while implementations described herein describe the server platform 420 as being hosted in cloud computing environment 422, in some implementations, platform 420 may not be cloud-based (i.e., may be implemented outside of a cloud computing environment) or may be partially cloud-based.

Cloud computing environment 422 includes an environment that hosts the server platform 420. Cloud computing environment 422 may provide computation, software, data access, storage, etc. services that do not require end-user knowledge of a physical location and configuration of system(s) and/or device(s) that hosts the server platform 420. As shown, cloud computing environment 422 may include a group of computing resources 424 (referred to collectively as "computing resources 424" and individually as "computing resource 424").

Computing resource 424 may include one or more personal computers, a cluster of computing devices, workstation computers, server devices, or other types of computation and/or communication devices. In some implementations, the computing resource 424 may host the server platform 420. The cloud resources may include instances computing and executing in the computing resource 424, storage devices provided in the computing resource 424, data transfer devices provided by the computing resource 424, and the like. In some implementations, the computing resource 424 may communicate with other computing resources 424 via wired connections, wireless connections, or a combination of wired and wireless connections.

As further shown in FIG. 4, the computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, or the like.

The application 424-1 may include one or more software applications that may be provided to or accessed by the network entities 410. The application 424-1 may eliminate the need to install and execute the software applications on the network entities 410. For example, the application 424-1 may include software associated with the server platform 420, software associated with the EMF, and/or any other software capable of being provided via cloud computing environment 422. In some implementations, one application 424-1 may send/receive information to/from one or more other applications 424-1, via virtual machine 424-2.

The virtual machine 424-2 may include a software implementation of a machine (e.g., a computer) that executes programs like a physical machine. Virtual machine 424-2 may be either a system virtual machine or a process virtual machine, depending upon the use and degree of correspondence to any real machine by the virtual machine 424-2. A system virtual machine may provide a complete system platform that supports the execution of a complete operating system ("OS"). A process virtual machine may execute a single program, and may support a single process. In some implementations, virtual machine 424-2 may execute on behalf of a user (e.g., a user associated with one or more of the network entities 410), and may manage infrastructure and/or configuration of cloud computing environment 422, such as data management, synchronization, or long-duration data transfers.

Virtualized storage 424-3 may include one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. The hypervisor 424-4 may present a virtual operating platform to the guest operating systems, and may manage the execution of the guest operating systems. Multiple instances of a variety of operating systems may share virtualized hardware resources.

Network 430 may include one or more wired and/or wireless networks. For example, network 430 may include a cellular network (e.g., a fifth generation (5G) network, a sixth generation (6G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

According to embodiments, the energy management function (EMF) of example embodiments described herein may be implemented or be deployed in the server platform 420 described above, in the form of virtualized network function (VNF). In this regard, it is contemplated that the terms "virtual", "virtualized", or the like, described hereinabove are merely intended to specify the nature of the machine (and the elements and resources associated therewith) being provided in virtual or software form. In this regard, the "virtual machine", "virtualized storage", and the like, described hereinabove should not be limited to any specific type of virtual machine or virtual element. Accordingly, it can be understood that the EMF may be defined or presented in the form of a containerized network function, of which the functions may be provided in the form of containers. Descriptions of an example implementation configuration for implementing the EMF in the form of the containerized network function are provided below with reference to FIG. 5.

To this end, by virtualizing and implementing the EMF in the server platform 420, which is separated from the network entities 410, the operations of the energy management, such as processing, computing, and managing the energy data, can be centrally performed in a separate node from the network entities 410. As a result, the energy consumption at the network entities 410 may be reduced, which could be particularly advantageous for network entities which are running on an independent power supply (e.g., battery, etc.).

Further, the resources for energy management (e.g., processing power, memory, storage, etc.) may be easily managed and dynamically scaled up or scaled down on demand, which in turn optimizes resource allocation and utilization. Furthermore, since the energy data and information are being collectively managed by the EMF, the energy data and information may be easily and securely managed, since said energy data and information may be easily cloned or backup to provide redundancy, and the access of said energy data and information may be authorized and authenticated to a trusted entity only.

Example Implementation of Containerized Energy Management Function

As described above, the energy management function (EMF) may be implemented in the form of a containerized network function, according to one or more embodiments. In the following, descriptions of an example configuration for implementing the containerized energy management function are provided.

Figure 5:
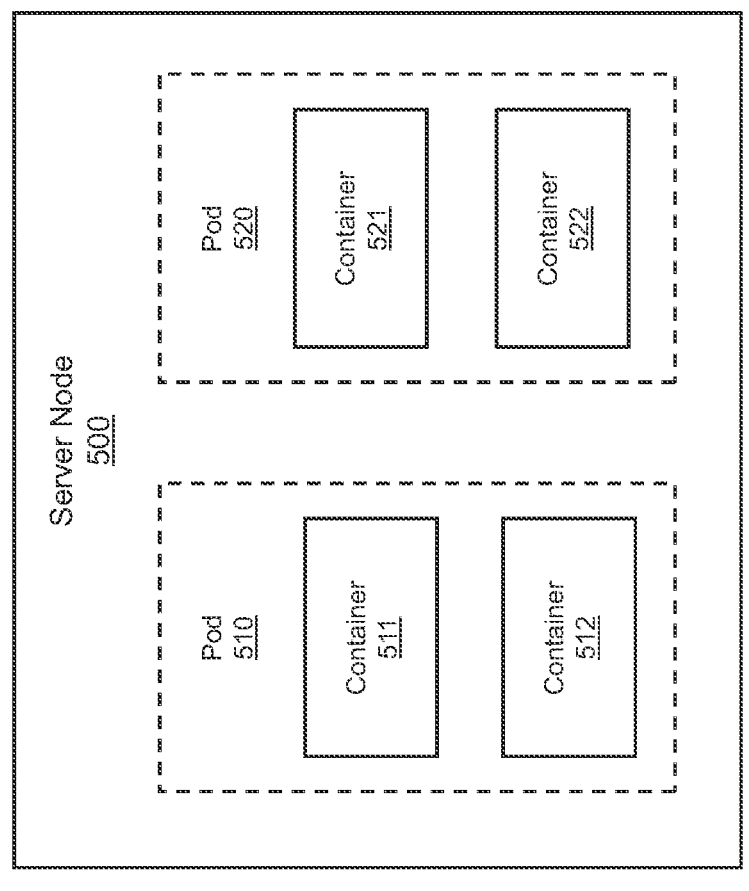
FIG. 5 illustrates a block diagram of example components of a container-based server node, according to one or more embodiments.

FIG. 5 illustrates a block diagram of example components of a server node 500, according to one or more embodiments. Server node 500 may correspond to any of the server node(s) of FIG. 1 to FIG. 3, and may be configured to implement the server platform of FIG. 4.

In this example embodiment, the energy management function (EMF) may be defined in software form via, for example, containerization (or any other suitable technology). Accordingly, the containerized EMF may be deployed, in the form of containers, in the server node 500, and the functionalities of the energy management function may be performed or be achieved via execution or orchestration of the containers associated with the energy management function.

As illustrated in FIG. 5, the server node 500 may include a plurality of containers 511-512 and 521-522. The containerized EMF may be disaggregated or scattered among the plurality of containers 511-512 and/or 521-522. For instance, the functionalities of the EMF may be segregated into a plurality of portions (e.g., a first portion of the functionalities is associated with a first operation, a second portion of the functionalities is associated with a second operation, etc.), and the plurality of portions of the functionalities may be scattered among the containers 511-512 and/or the containers 521-522. Additionally or alternatively, the EMF may be segregated according to the type of network function(s) associated therewith (e.g., AMF, SMF, NWDAF, NRF, NEF, etc.) in a similar manner.

According to embodiments, the server node 500 may include a Kubernetes (K8s) node, and the containers of the EMF may be grouped or aggregated in a respective pod (e.g., containers associated with a first function of the EMF are included in a first pod 510, containers associated with a second function of the EMF are included in a second pod 520, etc.).

The plurality of pods in the server node 500 may share the same resources (e.g., CPU, memory, etc.) provided by the server node 500. The resources being allocated for the EMF may be managed by adjusting the pods and/or containers associated with the EMF. For instance, the resources may be scaled up by increasing the number of containers and/or pods associated therewith, may be scaled down by decreasing the number of containers and/or pods associated therewith, or the like.

It can be understood that the configuration illustrated in FIG. 5 is simplified for descriptive purposes, and is not intended to limit the scope of the present disclosure. Specifically, in practice, the server node 500 may include any suitable components for hosting and executing a plurality of pods, while the number of pods may be greater than two and the number of containers included in each pod may be greater than two, without departing from the scope of the present disclosure. Further, it can be understood that the containerized EMF may be hosted or deployed in a plurality of server nodes, in a similar manner as described above. Furthermore, it can be understood that multiple nodes may include the same containers (or pods) to provide redundancy thereby improving the network availability.

In view of the above, example embodiments of the present disclosure may leverage the advantages of containerization in implementing the EMF for provisioning energy management. For instance, implementing containerized EMF offers improved scalability, since the EMF may be efficiently scaled according to demand and may be easily replicated and orchestrated across the server node(s), thereby enabling efficient resource utilization and seamless scaling.

Further, the containerized EMF may be quickly instantiated, migrated, and updated, allowing for faster time-to-market for new energy-efficient and/or energy management services and features. Furthermore, the functionalities of the EMF may be managed by adjusting the associated containers, enabling independent development, testing, and deployment of the EMF.

In addition, implementing a containerized EMF may also improve resource utilization efficiency, utilize container-specific security features to improve the system security, provide improved portability and interoperability, and enable seamless integration with different systems or platforms.

Example Components of Server Node

As described above, the energy management function (EMF) may be implemented in one or more server nodes, according to one or more embodiments. Below, descriptions of example components of the server node(s) for implementing the EMF, as well as an example configuration associated therewith, are provided.

Figure 6:
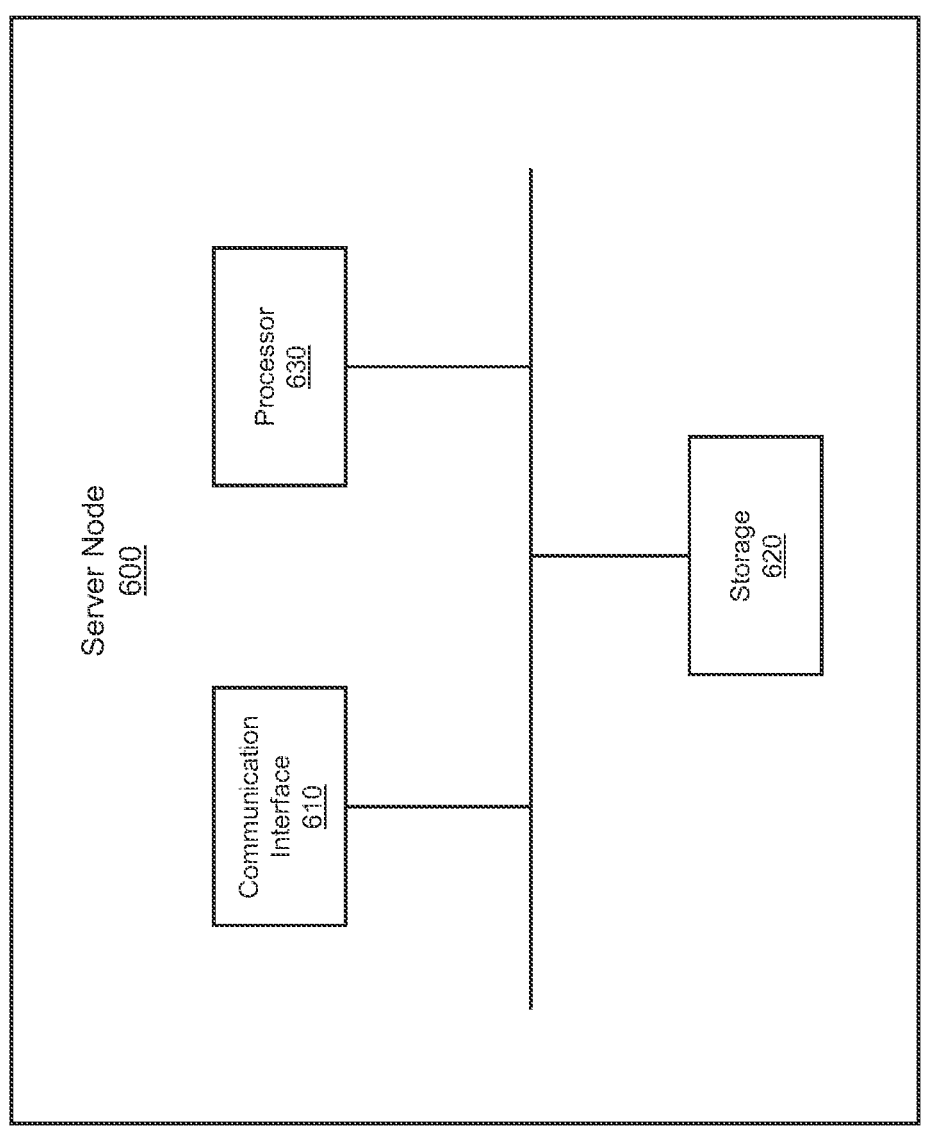
FIG. 6 illustrates a block diagram of example components of a server node, according to one or more embodiments.

FIG. 6 illustrates a block diagram of example components of a server node 600, according to one or more embodiments. Server node 600 may correspond to any of the server node(s) described above with reference to FIG. 1 to FIG. 5.

As illustrated in FIG. 6, the server node 600 may include at least one communication interface 610, at least one storage 620, and at least one processor 630, although it can be understood that the server node 600 may include more or less components than as illustrated in FIG. 6, and/or may be arranged in a manner different from as illustrated in FIG. 6, without departing from the scope of the present disclosure. For instance, as described below with reference to FIG. 7, the server node of example embodiments may include one or more additional components, such as an input/output module, and the like. One or more components of the server node 600 may be implemented using hardware, software, firmware, or any combinations thereof.

The communication interface 610 may include at least one transceiver-like component (e.g., a transceiver, a separate receiver and transmitter, a bus, an interconnect, etc.) that enables the components of the server node 600 to communicate with each other and/or to communicate with one or more components external to the server node 600, such as via a wired connection, a wireless connection, or a combination of wired and wireless connections.

For instance, the communication interface 610 may couple the processor 630 to the storage 620 to thereby enable them to communicate and to interoperate with each other in performing one or more operations. As another example, communication interface 610 may couple the server node 600 (or one or more components included therein) to one or more network entities, so as to enable them to communicate and to interoperate with each other. Further, the communication interface 610 may include, for example, an Advanced Technology Attachment (ATA) adapter, a Serial ATA (SATA) adapter, a Small Computer System Interface (SCSI) adapter, a redundant array of inexpensive disks (RAID) controller, a storage area network (SAN) adapter, a network adapter, and/or any suitable component.

According to embodiments, the communication interface 610 may include components or mechanisms configured to communicate with a plurality of network entities (and/or one or more OAM tools associated therewith) for obtaining one or more energy data of one or more network entities. In some implementations, the communication interface 610 may include at least one Service-Based Interface (SBI) which enables the EMF to communicate with one or more network functions (e.g., one or more network functions 120-1).

For instance, the interaction and communication among the EMF and the one or more network functions may be performed via a dedicated SBI interface, which is referred to herein as "Nemf". The energy management functionalities of the EMF may be exposed to the network entities via the Nemf interface. It can be understood that, in practice, the labeling of the SBI interface of the EMF may be presented in any suitable terms, such as "Nnesf", "Nesf", and the like, without departing from the scope of the present disclosure.

According to embodiments, the communication interface 610 may include a plurality of interfaces defined by reference point representations. For instance, the communication interface 610 may include at least the following three new interfaces: N110, N111, and N112. Further descriptions of said interfaces are provided below with reference to FIG. 13.

According to embodiments, the communication interface 610 may include one or more application programming interfaces (APIs) that allow the server node 600 (or one or more components included therein) to communicate with one or more software applications (e.g., software application deployed in the network entities, virtualized network function(s), etc.). In some implementations, the APIs may interact with the plurality of network functions exposed through the Nemf SBI and/or the SBI associated with the respective network function.

The storage 620 may include one or more storage mediums suitable for storing data, information, and/or computer-executable instructions therein. According to embodiments, the storage 620 may include at least one memory storage, such as a random access memory (RAM), a read-only memory (ROM), a programmable ROM (PROM), and/or another type of dynamic or static storage device (e.g., a flash memory, a magnetic memory, and/or an optical memory) that stores information and/or computer-readable instructions for use by the processor 630. Descriptions of an example memory storage are provided below with reference to memory 720 of FIG. 7.

Additionally or alternatively, the storage 620 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 620 may include at least one database including multiple storage mediums, such as hard disks and/or solid-state disks in a RAID configuration. In some embodiments, the database may include a SAN and/or a network attached storage (NAS) system. According to embodiments, the database may correspond to a distributed storage system, wherein individual databases are configured to store custom information, such as, historical data related to level of energy efficiency of each network entity, predicted energy usage pattern of each network entity, energy optimization rules or policies associated with different network entities, level of energy efficiency achieved, types of network resources/parameters associated with each network function, and the like. Descriptions of an example database are provided below with reference to database 730 of FIG. 7.

According to embodiments, the storage 620 may be configured to store information, such as raw data, metadata, or the like, obtained from one or more network entities (and/or one or more OAM tools associated therewith). Additionally or alternatively, the storage 620 may be configured to store one or more information associated with one or more operations performed by the processor 630. For instance, the storage 620 may store one or more energy data received from one or more network entities (and/or from one or more OAM tools associated with the one or more network entities), one or more energy computation results produced or generated by the at least one processor 630, information of network entities involved in the operation(s) performed by the processor 630, information of historical operations performed by the processor 630, information required for performing the operations (e.g., energy management policies, etc.), and/or the like.

Further, the storage 620 may be configured to store or host the EMF, and one or more information associated therewith (e.g., computer-readable instructions for implementing the EMF, resources required for executing the EMF, programming codes of the EMF, policies or predefined thresholds associated with the energy management, etc.). According to some embodiments, the storage 620 may be configured to store or host one or more network functions. For instance, the storage 620 may store or host one or more network functions described herein, such as AMF, SMF, NWDAF, UPF, NRF, NEF, and/or the like.

In some implementations, the storage 620 may include a plurality of storage mediums, and the storage 620 may be configured to store a duplicate or a copy of at least a portion of the information in the plurality of storage mediums, for providing redundancy and for backing up the information or the associated data.

The processor 630 may include at least one processor capable of being programmed or configured to perform a function(s) or an operation(s) described herein. According to embodiments, the processor 630 may be configured to receive (e.g., via the communication interface 610, etc.) one or more signals and/or instructions for triggering one or more operations.

Further, the processor 630 may be implemented in hardware, firmware, or a combination of hardware and software. For instance, the processor 630 may include at least one generic or specialized processing unit, such as at least one of: a central processing unit (CPU), a graphics processing unit (GPU), a general-purpose GPU (GPGPU), an accelerated processing unit (APU), a microprocessor, a microcontroller, a digital signal processor (DSP), a field-programmable gate array (FPGA), an application-specific integrated circuit (ASIC), an integrated system (bus) controller, a memory management control unit, a floating point unit, a hardware accelerator, a special-purpose computer chip, and/or another type of processing or computing unit. According to embodiments, the processor 630 may include a single-core processor, a multi-core processor, or a combination of one or more single-core processors and/or one or more multi-core processors.

The processor 630 may include a plurality of computing units or processing units, a portion of which may be associated with one or more dedicated processes or operations. For instance, as further described below with reference to FIG. 7, the processor may include at least one energy computation module associated with operations for computing energy data, and may include at least one energy management module associated with operations for managing energy efficiency.

According to embodiments, the processor 630 may be configured to execute the EMF stored in at least one storage medium or a memory storage (e.g., storage 620, etc.) to thereby perform one or more actions or one or more operations described herein. Additionally or alternatively, the processor 630 may be configured to execute computer-readable instructions associated with the EMF to thereby perform the one or more actions. For instance, the processor 630 may execute the EMF (or the instructions associated therewith) to request, collect, and/or obtain one or more energy data of one or more network entities (e.g., described above with reference to FIG. 1 to FIG. 5), to process the obtained energy data, and to perform one or more operations for facilitating provisioning of energy management to optimize energy efficiency of the one or more network entities. In addition, the processor 630 may be configured to execute the EMF (or the instructions associated therewith) to interoperate with one or more network functions (e.g., one or more network functions of a core network of the network system as described above, etc.). Descriptions of example operations which may be performed by the processor 630 are provided below with reference to FIG. 8 to FIG. 12.

Figure 7:
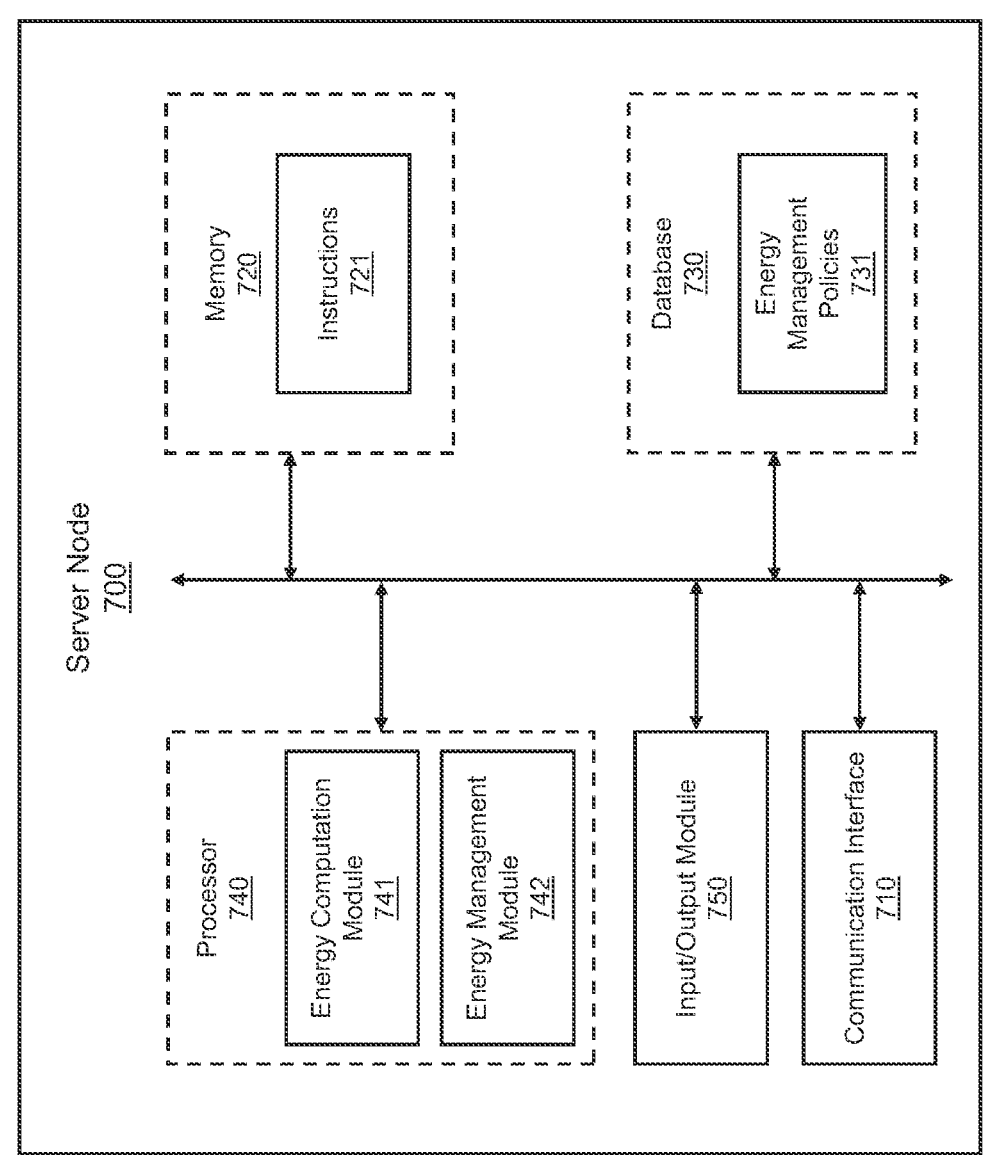
FIG. 7 illustrates a diagram of an example configuration of example components of a server node, according to one or more embodiments.

FIG. 7 illustrates a diagram of an example configuration of example components of a server node 700, according to one or more embodiments. One or more components of server node 700 may be part of one or more components of the server node 600 in FIG. 6. For instance, the communication interface 710 and the processor 740 in the server node 700 may be similar to the communication interface 610 and the processor 630 in the server node 600, respectively. Further, the memory 720 and the database 730 in the server node 700 may be part of the storage 620 in the server node 600. Thus, it can be understood that the features of the server node 600 and the features of the server node 700 described herein may be applicable to each other, unless described otherwise. Further, redundant descriptions associated therewith may be omitted below for conciseness.

As illustrated in FIG. 7, the components in the server node 700 may communicatively or operably couple to each other, and may be configured to interoperate with each other. In general, the processor 740 (or the modules associated therewith) may be configured to execute instructions 721 stored in the memory 720 and/or to utilize energy management policies 731 stored in the database 730 to perform one or more operations associated with energy management. In some implementations, the instructions 721 may be associated with a first portion of the EMF, and the energy management policies 731 may be associated with a second portion of the EMF.

The energy computation module 741 of the processor 740 may execute the instructions 721 to communicate with the plurality of network entities (e.g., network entities 120, etc.) and to receive energy data from the plurality of network entities (and/or one or more OAM tools associated with the plurality of network entities) via the communication interface 710. Accordingly, the energy computation module 741 may execute the instructions 721 to process the received energy data. Subsequently, the energy management module 742 of the processor 740 may utilize one or more energy management policies 731 (stored in the database 730) and the processed energy data to perform one or more energy management operations.

The one or more policies 731 may include, for example, policies and quality of service (QoS) requirements defined by network operators or service providers. The one or more policies may be utilized by the server node (or at least one processor associated therewith) to determine whether or not a level of energy efficiency of a network entity is within an acceptable/unacceptable level. For instance, the one or more policies 731 may include a plurality of predefined rules or thresholds defining the minimal energy efficiency required for ensuring promised QoS, for maintaining the carbon emission within a predefined level, for ensuring the percentage of utilization of renewable energies as the energy resources, and the like.

According to embodiments, the one or more policies 731 may indicate a network resource/parameter of a network entity that may be updated based on a level of energy efficiency determined for that network entity. By way of example, a predefined rule of the one or more policies 731 may indicate rejecting connection requests received by the NSACF, such as: blocking connections when connections ≥50 and latency ≥100 ms. In another example, a predefined rule of the one or more policies 731 may specify: admit a connection when connection=specific service in case of a specific service alone supported by the network system which is resource-constrained. It shall be noted that the one or more policies 731, and the predefined rules associated therewith, described above are merely provided for exemplary purposes, and the one or more policies 731 may have a plurality of predefined rule(s) with different constraint(s) on network resources/parameters for optimizing energy consumption and supporting energy efficiency in the telecommunication systems.

Further, information, such as instructions for performing an action or operation, an update on a policy, and the like, may be received from one or more users (e.g., network operator, end user, etc.) via the input/output module 750. Furthermore, information, such as results of the data computation, performed operations, and the like, may be outputted to the one or more users via the input/output module 750.

The input/output module 750 may include one or more components or mechanisms configured to receive data or information and/or to provide output data or information. According to embodiments, the input/output module 750 may include at least one input interface (e.g., a touchscreen display, a button, a switch, a microphone, a sensor, a keyboard, a mouse, a joystick, a keypad, soft keys, etc.) and/or at least one output interface (e.g., a display, a speaker, a ringer, one or more light-emitting diodes (LEDs), a LED-based display such as an active-matrix organic light-emitting diode (AMOLED) display, a thin-film transistor (TFT) display, a liquid crystal display (LCD), etc.).

According to embodiments, the processor 740 (or the modules included therein) may execute the instructions 721 for (1) receiving (e.g., from one or more network entities and/or one or more OAM tools associated therewith, etc.) data associated with energy consumption of one or more network entities for a predefined time, (2) managing energy consumption levels of at least one network entity based on one or more energy management policies 731, (3) determining a level of energy efficiency of each network entity based on a corresponding energy consumption, (4) determining a total energy efficiency of the network system based on the level of energy efficiency associated with each network entity of the plurality of network entities, (5) identifying one or more network resources/parameters for energy optimization in at least one network entity of the plurality of network entities, (6) receiving energy usage patterns of at least one network entity of the plurality of network entities based on a current energy consumption of the one or more network entities, and/or (7) dynamically adapting one or more network resources related to at least one network entity based on energy optimization policies. According to embodiments, the processor 740 (or the modules included therein) may be further configured to execute the instructions 721 to: (1) provide information related to the level of energy efficiency of each network entity to one or more user equipment associated with one or more users, and/or (2) provide the total energy efficiency of the communication network to one or more users.

To this end, example embodiments of the present disclosure may provide one or more server nodes in which the EMF may be implemented and be deployed. Accordingly, the one or more server nodes (or one or more processors associated therewith) may be configured to execute the EMF (or instructions for implementing the EMF) to perform one or more operations for provisioning energy management in the telecommunication system. Descriptions of several example operations which may be performed by the server node(s) of the present disclosure are provided below with reference to FIG. 8 to FIG. 12.

Example Operations and Use Cases

As described above, example embodiments of the present disclosure provide a server node (or any other suitable apparatus) that may utilize or execute an energy management function (EMF) (or instructions for implementing the EMF) to perform one or more energy management operations. Descriptions of example operations performable by the server node (or any other suitable apparatus) of example embodiments, as well as descriptions of example use cases associated therewith, are provided below with reference to FIG. 8 to FIG. 12.

Figure 8:
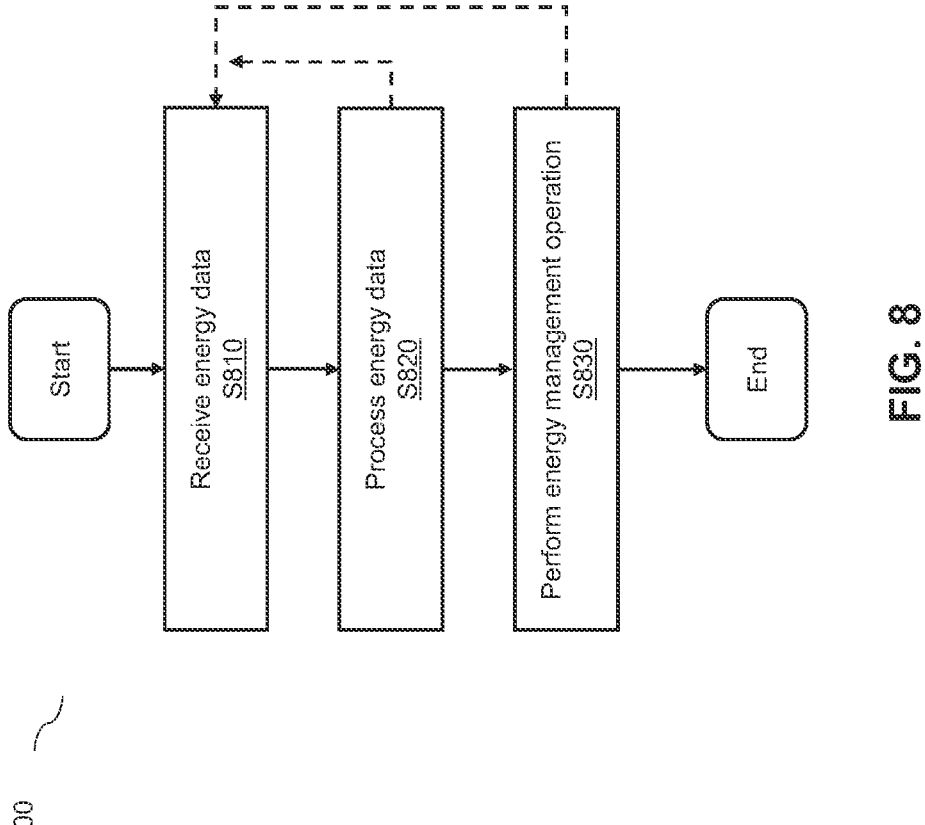
FIG. 8 illustrates a flow diagram of an example method for provisioning network energy management, according to one or more embodiments.

FIG. 8 illustrates a flow diagram of an example method 800 for provisioning energy management, according to one or more embodiments. One or more operations of method 800 may be performed by an apparatus of example embodiments. Specifically, the one or more operations may be performed by one or more server nodes, and the one or more server nodes may include at least one processor (e.g., processor 630, processor 740, etc.) which may, upon executing an EMF (or instructions for implementing the EMF) stored in one or more storage mediums (e.g., storage 620, memory 720, database 730, etc.), be configured to perform one or more operations described herein.

As illustrated in FIG. 8, at operation S810, the server node may be configured to receive one or more energy data. Specifically, the server node may communicate with a plurality of network entities (e.g. network entities 120) via one or more communication interfaces (e.g., communication interface 610, communication interface 710, etc.) to receive the one or more energy data therefrom. According to embodiments, one or more measurements (e.g., energy measurement, performance measurement, etc.) of the plurality of network entities are performed by one or more OAM tools, and the EMF may subscribe to the one or more OAM tools. In this case, at operation S810, the server node may request the one or more energy data from the one or more OAM tools, and the one or more OAM tools may provide the requested one or more energy data in response thereto.

By way of example, the server node may, upon executing the EMF (or instructions associated therewith), generate one or more requests or queries, and may provide the requests/queries to one or more network functions (or one or more components deploying said one or more network functions) via at least one SBI (e.g., Nemf, etc.). The one or more requests/queries may be provided to the one or more network functions via one or more APIs. Subsequently, the one or more network functions may provide the requested energy data to the server node, in a similar manner.

According to embodiments, the server node may be configured to continuously (or periodically) request and receive the energy data in real-time or near real-time. Accordingly, the energy data may be utilized for real-time or near real-time energy management, so as to dynamically manage the energy of the network entities according to real-time or near real-time conditions or requirements.

According to embodiments, the energy data described herein may include, but are not limited to:

Energy consumption information: This information may include energy consumption level of one or more network entities, such as energy consumed in one or more operations of one or more network functions, energy consumed in one or more operations of one or more network services, energy consumed in one or more operations of one or more network slices, energy consumed one or more protocol data unit (PDU) sessions of a UE, energy consumed by one or more operations of the UE, energy consumed by a component of a AN (e.g., base station, etc.), and the like. Further, this information may also include historical data associated with the energy consumption of each network entity.

Energy profile: This information may indicate how energy consumption varies under different conditions, such as idle mode, low traffic, peak traffic, a specific configuration, a specific duration, and the like. Further, this information may also include a prediction of energy usage patterns.

Energy metrics: This information may include metrics, such as energy per bit, energy per user, energy per operation, energy per service, and the like, which may provide quantitative measures of the performance of one or more network entities in terms of energy efficiency. This information may include historical energy metrics and/or predicted energy metrics.

Network information: This information may include network configurations and network topologies, such as number and placement of base stations, type of cells (e.g., small cells, femto cells, etc.), type of equipment (e.g., energy-efficient hardware, optimized software, etc.), information of energy resources (e.g., renewable, non-renewable, etc.), and the like.

Component status: This information may include status of hardware components (e.g., health status of base stations, resource availability status of server hosting the network functions, etc.) and status of software components (e.g., version number, etc.).

It can be understood that the energy data described herein may include any suitable data or information which may be utilized for determining energy efficiency of the network entities, in addition to or in alternative to the examples provided hereinabove. For instance, as described below with reference to example use case 1 to example use case 4, the energy data may further include predictive data and/or information of one or more energy efficiency factors.

In view of the above, at operation S810, the server node may obtain or receive data or information which, when being analyzed or processed, enables the server node to facilitate provisioning of energy management for one or more network entities.

Referring still to FIG. 8, upon performing operation S810, the method 800 may proceed to operation S820, at which the server node may be configured to execute the EMF (or instruction associated therewith) to process the energy data.

According to embodiments, the server node may determine, based on the energy data, energy consumption information of one or more network entities. For instance, the energy data may include energy metrics over a time period associated with the energy metrics, and the server node may determine the energy consumption of the one or more network entities based on the energy metrics and the time period. The server node may be configured to determine total energy consumption of a specific network entity over a specific period of time, total energy consumption of a specific group of network entities over a specific period of time, partial energy consumption of a specific network entity over a specific period of time, partial energy consumption of a specific group of network entities over a specific period of time, total/partial energy consumption of a specific operation, total/partial energy consumption of a specific group of operations, and/or the like.

According to embodiments, the energy data may include energy consumption information and energy metrics (e.g., performance measures, etc.) of at least one network entity of a plurality of network entities, and the server node may determine, based on the energy consumption information and the energy metric, a level of energy efficiency of the at least one network entity.

According to embodiments, the energy data may include energy consumption information and energy metrics of a plurality of network entities, and the server node may determine, based on the energy consumption information and the energy metrics, a level of energy efficiency of each network entity of the plurality of network entities.

According to embodiments, the server node may determine a total/partial energy efficiency of at least a portion of a network system. For instance, the server node may determine, based on at least the level of energy efficiency associated with each network entity of the plurality of network entities, a total energy efficiency of the overall network system. As another example, the server node may determine, based on at least the level of energy efficiency associated with a portion of the plurality of network entities, a partial energy efficiency of a portion of the network system.

Referring yet to FIG. 8, upon processing the energy data at operation S820, the method 800 may proceed to operation S830, at which the server node may be configured to execute the EMF (or instructions associated therewith) to perform one or more operations for provisioning energy management for the associated network entity(s) (may be referred to as "energy management operation" herein). Alternatively or additionally, upon performing operation S820, the method 800 may return to operation S810, such that the server node may be configured to receive further energy data.

According to embodiments, the one or more energy management operations may include one or more operations for managing energy information. For instance, the server node may report, publish, or expose information of the energy consumption and/or information of the level of energy efficiency to one or more network entities and/or to one or more users. For instance, the server node may provide said information, along with/without instructions for utilizing said information, to one or more network functions (via the communication interface), such that the one or more network functions may utilize said information for energy management.

As another example, the server node may share said information with one or more associated, trusted third parties (e.g., vendors, service providers, site management companies, authorized users, etc.). As yet another example, the server node may continuously or periodically store, backup, update, and/or remove the energy information in one or more storage mediums (e.g., server, etc.). One or more of the aforesaid operations may be performed continuously, periodically, or for a specific period of time.

According to embodiments, the one or more energy management operations may include one or more operations for managing at least one target network entity. For instance, the server node may identify, based on the level of energy efficiency associated with the plurality of network entities, the at least one target network entity, which may include at least one network entity that has a level of energy efficiency violating at least one predefined threshold (e.g., network entity which has low energy efficiency level, network entity which has high energy efficiency level but consumed a large amount of resources, etc.), at least one network entity from among a group of network entities which have low priority or less criticality in the network system, and the like. The at least one predefined threshold may be associated with at least one quality of service (Qos) requirement, and may be defined in at least one energy management policy (e.g., component 731 in FIG. 7, etc.).

Upon determining the at least one target network entity, the server node may perform the one or more operations for managing said at least one target network entity. Specifically, the server node may determine the cause(s) or factor(s) resulting in the level of energy efficiency (e.g., low energy efficiency, capped energy efficiency, etc.) of the at least one target network entity and may determine, from an action playbook comprising a list of operations, the one or more operations for managing the at least one target network entity therefrom. Said one or more operations may include resource management, operation management, state management, energy criteria management, and the like.

For instance, based on determining that the at least one target network entity has a low energy efficiency due to a partial failure of hardware resources, the server node may allocate additional hardware resources to the target network entity, may redeploy the network entity to a healthy hardware, and the like. Further, based on determining that the at least one target network entity has a capped energy efficiency (e.g., the level of energy efficiency has reached a maximum level and/or has not increased for a period of time), the server node may allocate additional resources to the target network entity to further improve the level of energy, may reduce redundant resources, and the like. Furthermore, based on determining that one or more renewable energy resources are available, the server node may allocate at least a portion of the energy resources associated with the at least one target network entity to the one or more renewable energy resources.

As another example, based on determining that the at least one target network entity has a low energy efficiency due to one or more operations (e.g., excessive amount of parallel operations, operation which consumed large amount of energy, etc.), the server node may instruct the at least one target network entity to pause or terminate operation(s) which has low priority or is not essential/less critical to the network system, may produce and provide the at least one target network entity a schedule for sequentially perform the operations in an optimized manner, may assign the operation(s) to another network entity(s), and the like.

As yet another example, based on determining that the at least one target network entity has a low energy efficiency and/or is reducing energy efficiency of other network entity(s), the server node may set the state of the at least one target network entity to idle state, to sleep state, or to off state.

As yet another example, the server node may manage, based on the level of energy efficiency of the at least one target network entity, one or more energy criteria associated with the at least one target network entity. For instance, the server node may fine-tune, update, adjust, prioritize, add, remove, duplicate, and the like, the one or more energy criteria associated with the at least one target network entity. In this regard, the term "energy criteria" described herein may refer to configuration or mechanism associated with energy efficiency, such as power saving mechanism (e.g., configuration for dynamic spectrum sharing, power level adjustment scheme, etc.), network configuration (e.g., network topology, network entities deployment strategy, etc.), device configuration (e.g., antenna configuration, radio transmission parameters, operations allowed in idle state, conditions for entering sleep mode, etc.), and the like.

In view of the above, the server node may execute the EMF (or instructions associated therewith) to automatically and appropriately receive one or more energy data from one or more network entities (and/or one or more OAM tools associated therewith), to process and manage the received energy data, and to perform one or more energy management operations on the one or more network entities, to thereby optimize the energy efficiency of the one or more network entities. In the following, several examples of use cases, in which the operations described herein may be implemented, are described.

Example Use Case 1: Predictive Energy Management

According to embodiments, the server node may be configured to execute the EMF (or instructions associated therewith) to interoperate with one or more network functions in provisioning energy management. Provided in the following are descriptions of an example use case in which the EMF interoperates with the Network Data Analytics Function (NWDAF) in providing predictive energy management.

Figure 9:
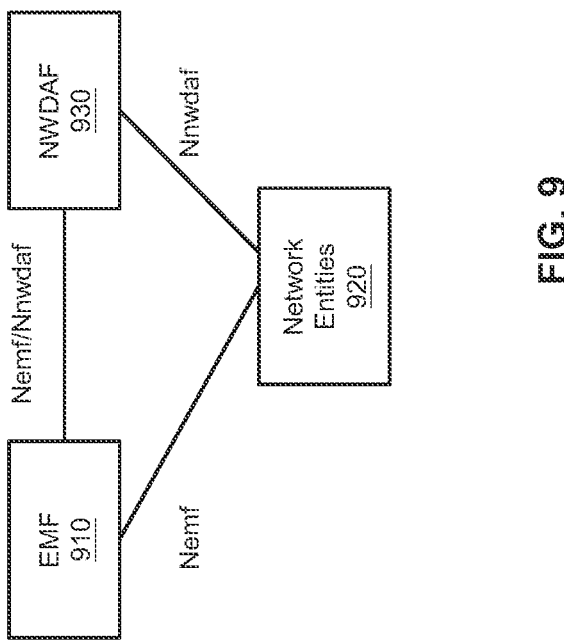
FIG. 9 illustrates a block diagram of an example system configuration associated with a first use case, according to one or more embodiments.

FIG. 9 illustrates a block diagram of an example system configuration 900 associated with a first use case, according to one or more embodiments. As illustrated in FIG. 9, the system configuration 900 may include an EMF 910 (or an apparatus deploying the EMF 910 such as the server node of example embodiments), a plurality of network entities 920, and a NWDAF 930 (or an apparatus deploying the NWDAF 930). The EMF 910 may be similar to the EMF described hereinabove. The NWDAF 930 may be one of the plurality of network functions described hereinabove, and the network entities 920 may include the remaining network functions, the UE, the AN, and/or the like, described hereinabove.

The EMF 910, the plurality of network entities 920, and the NWDAF 930 may be communicatively and operatively coupled to each other via suitable communication interfaces, such as via one or more SBIs described herein. For instance, the EMF 910 may communicate with the network entities 920 via a Nemf interface, the network entities 920 may communicate with the NWDAF 930 via a Nnwdaf interface, and the EMF 910 may communicate with the NWDAF 930 via the Nemf interface and/or the Nnwdaf interface.

In practice, the EMF 910, the plurality of network entities 920, and the NWDAF 930 may be hosted or deployed in one or more apparatuses, devices, or equipment, such as one or more server nodes described herein. Thus, it can be understood that the communication and interoperation among the EMF 910, the plurality of network entities 920, and the NWDAF 930 may also be presented or defined in terms of the communication and interoperation among the associated apparatuses, devices, or equipment. Similarly, it can be understood that one or more operations performable by the EMF 910 and the NWDAF 930 described herein may be performed by an apparatus, device, or equipment in which the EMF 910 and the NWDAF 930 are hosted or deployed.

In this regard, the NWDAF 930 described herein may refer to a component within the 3GPP system (e.g., 5G system, 6G system, etc.) architecture that is responsible for performing data analytics tasks. In the context of energy management, the NWDAF 930 may be utilized to collect energy data, to process the energy data to derive meaningful information and insight, and to provide support to various network functions and network services based thereon.

For instance, in the example of FIG. 9, the NWDAF 930 may communicate with one or more of the network entities 920 to continuously (or periodically) request and receive energy data therefrom. Alternatively or additionally, the NWDAF 930 may subscribe to one or more OAM tools, and then continuously (or periodically) request and receive energy data therefrom. In this regard, the energy data may include unprocessed data (e.g., raw data, metadata, etc.) such as those described above with reference to operation S810 of FIG. 8. Additionally or alternatively, the NWDAF 930 may communicate with the EMF 910 and receive the energy data therefrom. For instance, the server node may be configured to execute the EMF 910 (or instructions associated therewith) to send a prediction request to the NWDAF 930 for predicting energy usage patterns of at least one network entity of the plurality of network entities 920. The prediction request may include processed and/or unprocessed energy data (e.g., obtained by the EMF 910 via the plurality of network entities 920 and/or one or more OAM tools associated therewith), such as a current energy consumption of the at least one network entity of the one or more network entities 920, the data utilized for determining said current energy consumption, and/or the like.

Upon receiving the energy data from the EMF 910 and/or the network entities 920, the NWDAF 930 may perform one or more operations to process the energy data. According to embodiments, said one or more operations may include: data mining, machine learning, statistical analysis, and/or any other suitable operation which may identify patterns, relationships, correlations, trends, and the like, in the energy data. Accordingly, the NWDAF 930 may generate insights (e.g., key energy parameters associated with energy efficiency, unusual operations which may result in a low level of energy efficiency, etc.), recommendations (e.g., possible adjustment on one or more configurations on the network entities to improve energy efficiency, etc.), and predictions (e.g., future energy usage/efficiency pattern, impact of low/ high energy efficiency, forecast of network traffic, etc.), based on the analyzed data.

Subsequently, the NWDAF 930 may provide the data or information, such as the insights, recommendations, and predictions described hereinabove (may be referred to as "predictive data") to the EMF 910. In this regard, it can be understood that at operation S810 of the method 800 (described above with reference to FIG. 8), the predictive data may be received by the server node (which is deploying or executing the EMF 910), in the form of or in addition to the described energy data. For instance, at operation S810, the server node may request and receive the predictive data from the NWDAF 930, when requesting the energy data from other network entity(s), in a similar manner as described above. Alternatively or additionally, the server node may request and receive the predictive data from the NWDAF 930 after processing the energy data (at operation S820), and/or after performing the one or more energy management operations (at operation S830).

Accordingly, the server node may utilize the predictive data, along with the energy data, to perform one or more predictive energy management operations. For instance, the server node may provide information of energy consumption of at least one network entity to the NWDAF 930 and request the NWDAF 930 to perform a prediction on the future energy usage patterns of the at least one network entity. The NWDAF 930 may process the received information, generate the requested prediction, and provide the generated prediction to the server node. Subsequently, the server node may execute the EMF (or instructions associated therewith) to process the energy data associated with one or more network entities (received at operation S810), taking into consideration the prediction of the future energy usage patterns.

To this end, the server node of example embodiments may utilize the EMF 910 while leveraging the NWDAF 930 data analytics capabilities to perform predictive energy management. Accordingly, the network entities 920, as well as the resources and operations associated therewith, may be dynamically and effectively adjusted for optimal energy efficiency.

It can be understood that one or more operations associated with NWDAF 930 may be implemented along with one or more operations of another use case(s) described herein, such that the predictive energy management may be performed in said another use case(s).

Example Use Case 2: Energy Management in Access, Mobility, and Session Management Operations As described above, according to embodiments, the server node may be configured to utilize the EMF to interoperate with one or more network functions in provisioning energy management. Provided in the following are descriptions of an example use case in which the EMF interoperates with an Access and Mobility Management Function (AMF), a Session Management Function (SMF), and a User Plane Function (UPF) in providing energy management.

Figure 10:
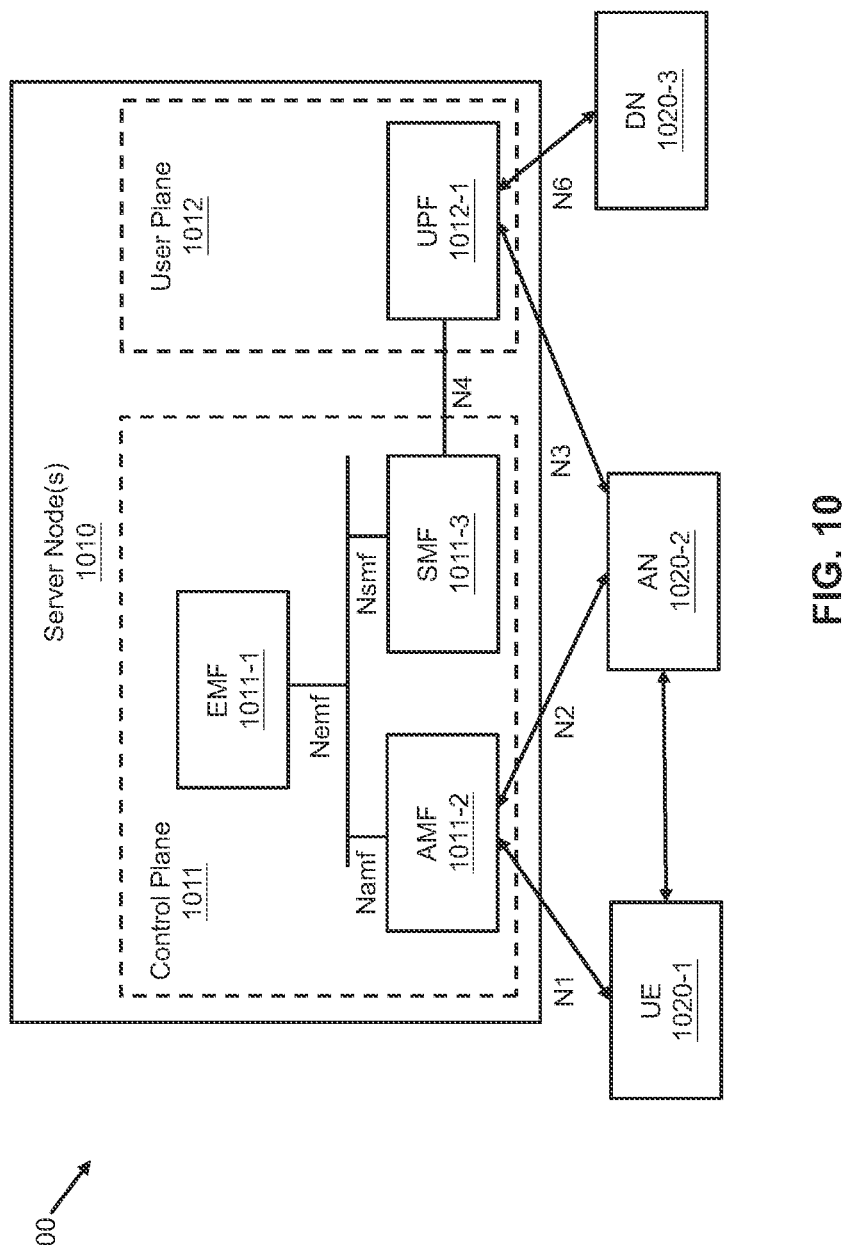
FIG. 10 illustrates a block diagram of an example system configuration associated with a second use case, according to one or more embodiments.

FIG. 10 illustrates a block diagram of an example system configuration 1000 associated with a second use case, according to one or more embodiments. As illustrated in FIG. 10, the system configuration 1000 may include an EMF 1011-1, an AMF 1011-2, an SMF 1011-3, an UPF 1012-1, a user equipment (UE) 1020-1, an access network (AN) 1020-2, and a data network (DN) 1020-3. The EMF 1011-1 may be similar to the EMF described hereinabove, and the AMF 1011-2, the SMF 1011-3, the UPF 1012-1, the UE 1020-1, the AN 1020-2, and the DN 1020-3 may be part of the network entities described hereinabove.

According to embodiments, the EMF 1011-1, the AMF 1011-2, and the SMF 1011-3 may form a portion of a Control Plane 1011, and the UPF 1012-1 may form a portion of a User Plane 1012. Alternatively or additionally, a portion of the EMF 1011-1 may be associated with the User Plane 1012.

The EMF 1011-1 and other components in FIG. 10 may be communicatively and operatively coupled to each other via suitable communication interfaces. For instance, the EMF 1011-1 may communicate with the AMF 1011-2 via Nemf interface and/or Namf interface, the EMF 1011-1 may communicate with the SMF 1011-3 via the Nemf interface and/or Nsmf interface, the AMF 1011-2 may communicate with the UE 1020-1 via N1 interface and with the AN 1020-2 via N2 interface, the SMF 1011-3 may communicate with the UPF 1012-1 via N4 interface, the AN 1020-2 may communicate with the UPF 1012-1 via N3 interface, and the UPF 1012-1 may communicate with the DN 1020-3 via N6 interface. In practice, the EMF 1011-1 and at least a portion of the network entities 1011-2 to 1020-3 may be hosted or deployed in one or more apparatuses, devices, or equipment (such as one or more server nodes described herein). Thus, it can be understood that the communication and interoperation among the EMF 1011-1 and the plurality of network entities 1011-2 to 1020-3 may also be presented or defined in terms of the communication and interoperation among the associated apparatuses, devices, or equipment. Similarly, it can be understood that one or more operations performable by the EMF 1011-1, the AMF 1011-2, the SMF 1011-3, and the UPF 1012-1 described herein may be performed by an apparatus, device, or equipment in which the EMF 1011-1, the AMF 1011-2, the SMF 1011-3, and the UPF 1012-1 are hosted or deployed.

Further, although it is illustrated in FIG. 10 that the server node(s) 1010 includes the EMF 1011-1, the AMF 1011-2, the SMF 1011-3, and the UPF 1012-1, it can be understood that the EMF 1011-1, the AMF 1011-2, the SMF 1011-3, and/or the UPF 1012-1, may be hosted or stored in different server nodes, without departing from the scope of the present disclosure. For instance, the EMF 1011-1 may be deployed or hosted in a first server node (e.g., one or more edge server nodes), while the AMF 1011-2, the SMF 1011-3, and the UPF 1012-1 may be deployed or hosted in a second server node (e.g., one or more central server nodes), and the like.

The AMF 1011-2 described herein may refer to an entity responsible for managing access and mobility operations of network entities, ensuring efficient and secure connectivity between the network entities. For instance, when the UE 1020-1 first accessing the network system, the access procedures (e.g., authorization, resource allocation, etc.) may be performed by the AMF 1011-2, such that the UE 1020-1 may securely and efficiently communicate with other network entities, such as the AN 1020-2. The AN 1020-2 may include a radio access network (RAN), which may include at least one base station (e.g., eNodeB, gNodeB, etc.), at least one radio unit (e.g., remote radio unit (RRU), etc.), at least one antenna system (e.g., distributed antenna system (DAS), etc.), at least one radio network controller, and any other suitable components.

In view of the above, the AMF 1011-22 has a critical role in the network system, since it is responsible for managing access to the network and handling mobility-related functions of a large number of network entities. Thus, it is important to provide optimal energy management to the AMF 1011-2, so as to ensure energy efficiency of the AMF 1011-2. In this regard, several example factors which may affect the energy efficiency of the AMF 1011-2 include:

Network Traffic Load: The amount of network traffic handled by the AMF 1011-2 can impact the energy efficiency of the AMF 1011-2. Generally, higher traffic loads may require more processing power and resources, leading to increased energy consumption and may affect the energy efficiency of the AMF 1011-2.

Network Topology: The network topology, including the number and distribution of network nodes/entities hosting the AMF 1011-2, can influence the energy efficiency of the AMF 1011-2. For instance, the network topology may affect the signaling scheme of the AMF 1011-2, which in turn affects the number of processes and operations (e.g., handover, etc.) performed by the AMF 1011-2.

Resource Management: The resource management, such as scheduling and allocation of radio and network resources, can impact energy efficiency of the AMF 1011-2.

Operational Modes: The available operational modes and the associated configurations can influence the energy efficiency of the AMF 1011-2. For instance, an AMF with sleep modes or low-power modes implemented during periods of inactivity can reduce energy consumption and can thereby improve energy efficiency of the AMF 1011-2. Further, the configuration of the sleep modes or low-power mode, such as the active cycle, the inactive-cycle, the number of operations allowed in low-power mode, and the like, can affect the energy efficiency of the AMF 1011-2.

Routing and Handover Algorithms: The routing and handover algorithms employed by the AMF 1011-2 can impact the number of unnecessary handovers, signaling overheads, and energy wastage, thereby affecting the energy consumption and energy efficiency of the AMF 1011-2.

Processing and Computational Load: The computational load on the AMF 1011-2, such as the type of signaling and control functions, can influence energy efficiency. For instance, the energy consumption for processing or computing complex signaling can be large, thereby affecting the energy consumption and the energy efficiency of the AMF 1011-2.

Network Protocol Configuration: The design of network protocols utilized by the AMF 1011-2 can impact the energy efficiency of the AMF 1011-2. For instance, the protocol designs, such as the protocol message formats, may affect the number of control messages required to be sent in operation, thereby affecting the energy consumption and energy efficiency of the AMF 1011-2.

It can be understood that the factors which may directly and/or indirectly affect the energy efficiency (may be referred to as "energy efficiency factors" herein) may further include any other suitable energy efficiency factors, without departing from the scope of the present disclosure.

According to embodiments, the server node may execute the EMF 1011-1 (or instructions associated therewith) to perform one or more operations of method 800 to provide energy management on the AMF 1011-2. For instance, the server node may, upon utilizing the EMF 10111-1, communicate with the AMF 1011-2 (via Nemf interface and/or Namf interface) to obtain and receive energy data, in a similar manner described above with reference to operation S810.

In this regard, it can be understood that the received energy data may include one or more of the above-described energy efficiency factors, in addition to and/or in alternative to the example energy data described above with reference to FIG. 8. Further, the server node may communicate with the NWDAF (or one or more components hosting the NWDAF), so as to obtain predictive energy data associated with the AMF 1011-2 therefrom.

Upon receiving the energy data (with/without predictive data), the server node may process the received energy data, in a similar manner described above with reference to operation S820. According to embodiments, the server node may determine, based on the received energy data and one or more energy management policies, one or more optimal configurations for the AMF 1011-2. For instance, the server node may determine a level of energy efficiency of the AMF 1011-2, and may determine whether or not the level of energy efficiency of the AMF 1011-2 satisfies or exceeds a predefined level (e.g., a minimal energy efficiency level defined by the energy management policy(s) such as QoS requirement, etc.).

Accordingly, based on determining that the level of energy efficiency of the AMF 1011-2 does not satisfy or is below the predefined level, the server node may determine that the energy efficiency of the AMF 1011-2 is required to be improved or optimized. In this regard, the server node may determine one or more target energy efficiency factors which result in the level of energy efficiency, and may determine one or more operations for optimizing the one or more target energy efficiency factors.

For instance, based on determining that the low level of energy efficiency is caused by the overloading of network traffic, the server node may determine one or more network entities (e.g., Wi-Fi, small cells, etc.) to which at least a portion of the network traffic load of the AMF 1011-2 can be offloaded. As another example, based on determining that the low level of energy efficiency is caused by sub-optimal operational mode (e.g., the load of the AMF 1011-2 is low, but the AMF 1011-2 is in a high-performance mode which consumes a huge amount of energy, etc.), the server node may determine an operational mode (e.g., low-power mode, sleep mode, etc.) based on the information of the current load. It can be understood that the server node may appropriately determine one or more optimal configurations for other energy efficiency factors (e.g., network topology, resource management, etc.) described herein in a similar manner, without departing from the scope of the present disclosure.

Upon processing the energy data, the server node may perform one or more energy management operations to manage AMF 1011-2, in a similar manner described above with reference to operation S830. According to embodiments, the server node may output, to the AMF 1011-2 (or one or more components hosting the AMF 1011-2), information defining one or more operations for optimizing one or more energy efficiency factors. In this way, the AMF 1011-2 may utilize the information provided by the EMF 1011-1 to optimize energy consumption, so as to optimize energy efficiency thereof. The EMF 1011-1 may be utilized to provide energy management to the SMF 1011-3 and the UPF 1012-1, in a similar manner.

Referring still to FIG. 10, the Session Management Function (SMF) 1011-3 may refer to a network function which is responsible for managing and controlling the session-related aspects of network entities (e.g., UE, etc.). The key functions of SMF 1011-3 may include, for example, session establishment (e.g., allocating of network resources, setting up necessary control and bearer paths, establishing session context, etc.), user plane and control plane separation (e.g., interacting with the Control Plane Function (CPF) to handle control plane signaling and management while delegating the user plane data handling to the User Plane Function (UPF), etc.), policy and quality of service (QoS) enforcement (e.g., enforcing policies and QoS requirements defined by network operators or service providers, ensuring that the appropriate QoS levels are applied to user sessions, ensuring policies related to data usage, traffic management, and service differentiation are enforced, etc.), network slice management (e.g., coordinating the allocation of network resources, policies, and QoS parameters specific to the network slice associated with a particular session, etc.), and the like.

Further, the User Plane Function (UPF) 1012-1 may refer to a network function which is responsible for handling the user data plane in the network. The key functions of UPF 1012-1 may include, for example, data routing and forwarding (e.g., receiving user data packets from the SMF and routing them to their intended destinations, etc.), providing QoS management (e.g., applying QoS policies and managing the allocation of network resources to meet the specified QoS requirements for user data traffic, controlling the delivery of data packets based on the QoS parameters defined by the SMF 1011-3, etc.), performing data processing tasks (e.g., data traffic shaping, data packet inspection, content filtering, etc.), interworking with data networks (e.g., facilitating the interworking and integration with external 3GPP networks and/or non-3GPP networks, handling the adaptation and conversion of protocols, formats, or interfaces to enable seamless communication between the networks, etc.), and the like.

The data network (DN) 1020-3 may include one or more networks, such as 3GPP network(s) and/or non-3GPP network(s), that are involved in data transmission in the telecommunication network ecosystem. For instance, the data network refers to the network infrastructure that enables the exchange of data between different network entities, such as UE, network functions, and external networks. This infrastructure includes both the 3GPP-networks (e.g., core network, etc.) and non-3GPP networks (external networks accessed through the 3GPP-networks). Additionally, the data network may also involve non-3GPP networks, such as the Internet, private enterprise networks, or other external networks. These non-3GPP networks may be connected to the 3GPP-networks through interworking functions and gateways, allowing data to be exchanged between the core network and external networks.

In summary, the SMF 1011-3 and UPF 1012-1 may be utilized to establish and manage user sessions, ensure proper QoS enforcement, handle data routing and forwarding, and enable efficient and secure data transmission among the network entities. In this regard, the energy efficiency of the SMF 1011-3 and UPF 1012-1 may be affected by one or more energy efficiency factors (e.g., network traffic load, network topology, resource management configuration, operational modes, processing and computational load, etc.) similar to those described above with reference to the AMF 1011-2. In addition, the energy efficiency factors of the SMF and UPF may further include data-related factors, such as:

Data Compression Configuration and Protocol: The data being routed and transmitted via SMF 1011-3 and UPF 1012-1 may be compressed to reduce the data size for routing and transmission. Accordingly, the compression techniques and protocols, which may affect the amount and size of data to be processed and transmitted, may affect the energy consumption of the SMF 1011-3 and UPF 1012-1, thereby affecting the energy efficiency thereof.

Data Routing Configuration: The configuration for routing the data packets, such as routing decisions, routing cycle, amount and size of data per routing, and the like, may affect the energy consumption of the SMF 1011-3 and the UPF 1012-1.

It can be understood that the energy efficiency factors of the SMF 1011-3 and the UPF 1012-1 may further include any other suitable energy efficiency factors which may directly and/or indirectly affect the energy efficiency of the SMF 1011-3 and the UPF 1012-1, without departing from the scope of the present disclosure.

Further, the SMF 1011-3 may handle session management associated with a plurality of UEs 1020-1. In this case, the server node may, upon utilizing the EMF 1011-1, communicate with the SMF 1011-3 (via Nemf interface and/or Nsmf interface) to obtain and receive energy data associated with at least one of: (1) each task performed by the SMF 1011-3 for all UEs, (2) each task performed by the SMF 1011-3 for one specific UE, and (3) overall energy consumption associated with the one or more tasks currently performed by the SMF 1011-3. Additionally or alternatively, the server node may, upon utilizing the EMF 1011-1, communicate with one or more OAM tools associated with the SMF 1011-3 to obtain and receive one or more of the aforesaid energy data.

By way of example, the server node may receive energy consumption $E_1$ associated with interacting with a decoupled data plane for managing data session for the UE 1020-1, energy consumption $E_2$ associated with PDU Session Management for UE 1020-1, and energy consumption $E_3$ associated with managing session context with the UPF 1012-1 for the session initiated by the UE 1020-1. In another example, the server node may receive the $E_1$, $E_2$ and $E_3$ for managing session of all UEs connected to the AN 1020-2. In yet another example, the server node may receive energy consumption $E_{tot}$ associated with all tasks currently being performed by the SMF 1011-3. It can be understood that the server node may be configured to receive any other energy data described herein, in a similar manner.

Accordingly, the server node may utilize the EMF 1011-1 to perform one or more operations of method 800 to provide energy management on the SMF 1011-3 and/or the UPF 1012-1, in a similar manner described above with reference to the provisioning of energy management on the AMF 1011-2.

In view of the above, the server node of example embodiments may utilize the EMF 1011-1 to interoperate with the AMF 1011-2, the SMF 1011-3, and the UPF 1012-1, thereby providing energy management for the access, mobility, and session management operations. For instance, the server node may, upon executing the EMF 1011-1 (or instructions associated with the EMF 1011-1), automatically detect one or more target AMF, SMF, and UPF, of which the energy need to be managed. Accordingly, the server node may detect one or more optimal configurations for managing the target AMF, SMF, and/or UPF, and to manage said target AMF, SMF, and UPF accordingly. Accordingly, the energy consumed in the operations associated with the target AMF, SMF, and UPF may be reduced, which in turn optimizes the energy efficiency of each of the target AMF, SMF, and UPF and resulting in the improvement of the energy efficiency of the network system.

Example Use Case 3: Energy Management of Network Repository Function

As described above, according to embodiments, the server node may be configured to execute the EMF (or instructions associated therewith) to interoperate with one or more network functions in provisioning energy management. Provided in the following are descriptions of an example use case in which the EMF interoperates with the Network Repository Function (NRF) in providing energy management.

Figure 11:
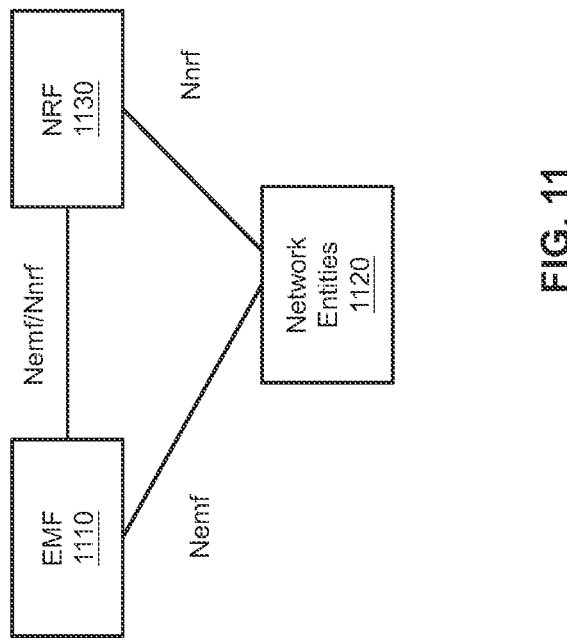
FIG. 11 illustrates a block diagram of an example system configuration associated with a third use case, according to one or more embodiments.

FIG. 11 illustrates a block diagram of an example system configuration 1100 associated with a third use case, according to one or more embodiments. As illustrated in FIG. 11, the system configuration 1100 may include an EMF 1110, a plurality of network entities 1120, and a NRF 1130. The EMF 1110 may be similar to the EMF described hereinabove. The NRF 1130 may be one of the plurality of network functions described hereinabove, and the network entities 1120 may include the remaining network functions, the UE, the AN, and/or the like, described hereinabove.

The EMF 1110, the plurality of network entities 1120, and the NRF 1130 may be communicatively and operatively coupled to each other via suitable communication interfaces, such as via one or more SBIs described herein. For instance, the EMF 1110 may communicate with the network entities 1120 via Nemf interface, the network entities 1120 may communicate with the NRF 1130 via Nnrf interface, and the EMF 1110 may communicate with the NRF 1130 via the Nemf interface and/or the Nnrf interface.

In practice, the EMF 1110, the plurality of network entities 1120, and the NRF 1130 may be hosted or deployed in one or more devices or equipment such as one or more server nodes described herein. Thus, it can be understood that the communication and interoperation among the EMF 1110, the plurality of network entities 1120, and the NRF 1130 may also be presented or defined in terms of the communication and interoperation among the associated devices/equipment. Similarly, it can be understood that one or more operations performable by the EMF 1110 and the NRF 1130 described herein may be performed by an apparatus, device, or equipment in which the EMF 1110 and the NRF 1130 are hosted or deployed.

In this regard, the Network Repository Function (NRF) described herein may refer to a component or network function responsible for managing network data and configuration information. For instance, the NRF may be configured to manage the data and information associated with the plurality of network entities 1120. The energy efficiency of the NRF 1130 may be affected by several energy efficiency factors, such as:

Data Storage and Retrieval Mechanism: The efficiency of data storage and retrieval mechanisms utilized by the NRF 1130 can impact the energy efficiency of the NRF 1130. For instance, by utilizing optimized storage technologies, such as solid-state drives (SSDs) or data compression techniques, energy consumption of the NRF 1130 may be reduced. Further, by utilizing efficient data retrieval algorithms and caching mechanisms, the time and energy required to access network data may be reduced.

Data Replication and Distribution Mechanism: The mechanisms utilized by the NRF 1130 for replicating and distributing network data across multiple network entities (e.g., across multiple NRF instances, across NRF 1130 and a database, etc.) can affect energy efficiency of the NRF 1130. For instance, by utilizing strategies, such as intelligent data replication and placement, data transmission and retrieval overhead may be reduced, leading to lower energy consumption.

Data Synchronization Mechanism: The mechanisms utilized by the NRF 1130 to synchronize NRF instances and other network components may impact energy efficiency of the NRF 1130. By minimizing unnecessary data synchronization and employing energy-efficient synchronization protocols, energy consumption of the NRF 1130 may be reduced.

Network Topology: The network topology and distribution of NRF instances may impact energy efficiency of the NRF 1130. By optimizing placement of NRF instances, data transmission distances may be reduced, leading to lower energy consumption of the NRF 1130.

Resource Management Configuration: Effectiveness of resource management within the NRF 1130, such as intelligent utilization of storage and computing resources, can impact energy efficiency of the NRF 1130. By optimizing resource allocation and usage, energy consumption of the NRF 1130 may be reduced.

It can be understood that the energy efficiency factors of the NRF 1130 may further include any other suitable energy efficiency factors which may directly and/or indirectly affect the energy efficiency of the NRF 1130, without departing from the scope of the present disclosure.

In view of the above, the at least one processor of the server node may, upon executing the EMF 1110, receive energy data from the plurality of network entities 1120 and the NRF 1130 (and/or one or more OAM tools associated therewith), and may perform one or more operations of method 800 to process the received energy data and to perform one or more energy management operations for optimizing the energy efficiency of the NRF 1130, in a similar manner as described above with reference to use case 1 and use case 2.

Example Use Case 4: Energy Information Exposure

As described above, according to embodiments, the server node may execute the EMF (or instructions associated therewith) to share, publish, or expose energy-associated information, such as information of energy consumption, information of level of energy efficiency, and the like, to one or more network entities. Provided in the following are descriptions of an example use case in which the EMF interoperates with the Network Exposure Function (NEF) in exposing the energy information.

Figure 12:
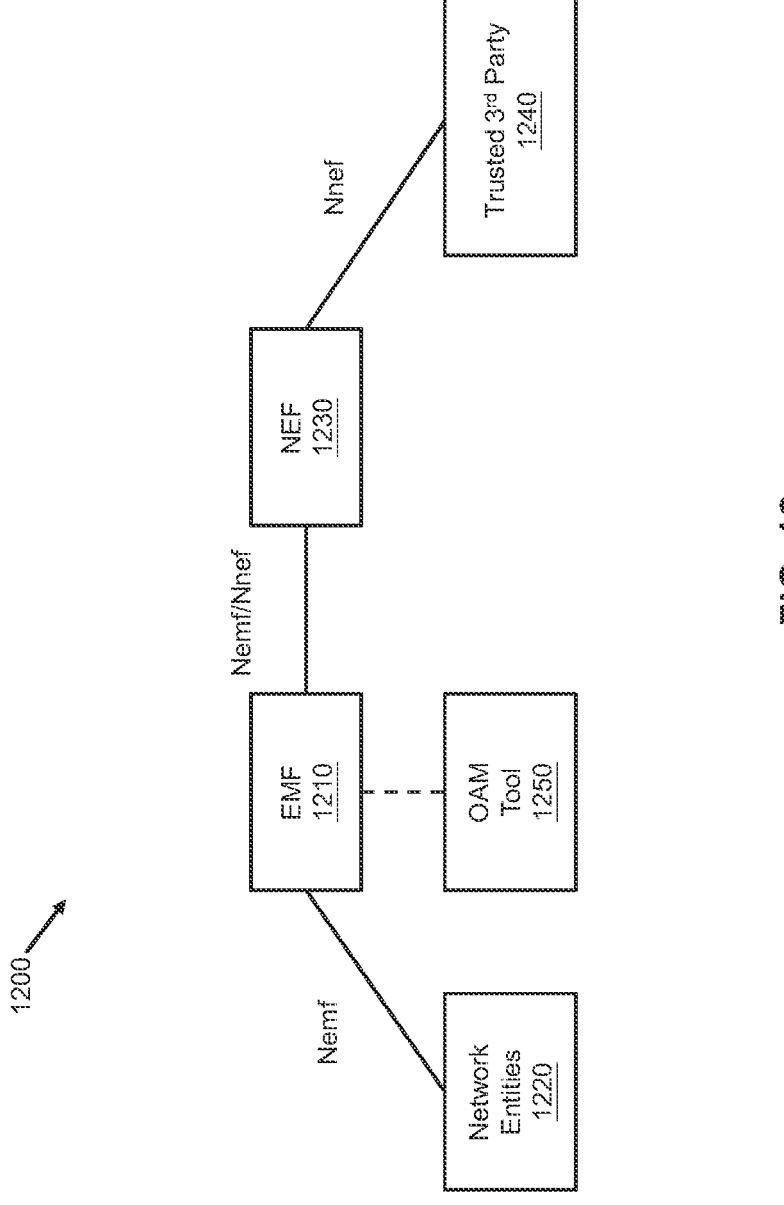
FIG. 12 illustrates a block diagram of an example system configuration associated with a fourth use case, according to one or more embodiments.

FIG. 12 illustrates a block diagram of an example system configuration 1200 associated with a fourth use case, according to one or more embodiments. As illustrated in FIG. 12, the system configuration 1200 may include an EMF 1210, a plurality of network entities 1220, and a NEF 1230, and a trusted third party 1240. The EMF 1210 may be similar to the EMF described hereinabove. The NEF 1230 and the trusted third party 1240 may be part of the plurality of network entities described hereinabove, and the network entities 1220 may include the remaining network functions, the UE, the AN, and/or the like, described hereinabove. The OAM tool 1250 may refer to the one or more OAM tools described hereinabove.

The EMF 1210, the plurality of network entities 1220, the NEF 1230, and the trusted third party 1240 may be communicatively and operatively coupled to each other via suitable communication interfaces, such as via one or more SBIs described herein. For instance, the EMF 1210 may communicate with the network entities 1220 via Nemf interface, the EMF 1210 may communicate with the NEF 1230 via the Nemf interface and/or Nnef interface, and the NEF 1230 may communicate with the trusted third party 1240 via the Nnef interface. The OAM tool 1250 may be communicatively coupled to the network entities 1220 and the NEF 1230, and may be configured to continuously (or periodically) perform one or more measurements (e.g., energy measurement, performance measurement) thereon. Accordingly, the OAM tool 1250 may, upon request by the EMF 1210, provide energy data associated with the network entities 1220 and/or the NEF 1230 to the EMF 1210.

In practice, one or more of the EMF 1210, the plurality of network entities 1220, the NEF 1230, and the trusted third party 1240 may be hosted or deployed in one or more apparatuses, devices, or equipment such as one or more server nodes described herein. Thus, it can be understood that the communication and interoperation among the EMF 1210, the plurality of network entities 1220, the NEF 1230, and the trusted third party 1240 may also be presented or defined in terms of the communication and interoperation among the associated apparatuses, devices, or equipment. Similarly, it can be understood that one or more operations performable by the EMF 1210 and the NEF 1230 described herein may be performed by an apparatus, device, or equipment in which the EMF 1210 and the NF 1230 are hosted or deployed.

In this regard, the NEF 1230 described herein may refer to a network function that utilizes the network architecture (e.g., 3GPP network architecture such as 5G network architecture, 6G network architecture, etc.) to enable energy information exposure within the network. Namely, the NEF 1230 enables one or more authorized third parties (e.g., third-party's applications, systems, devices, etc.) to access the energy information. The energy efficiency of the NEF 1230 may be affected by several energy efficiency factors, such as:

Network Traffic Load: The amount of network traffic handled by the NEF 1230 can impact its energy efficiency. For instance, higher traffic loads may require more processing power and resources, leading to the increased energy consumption of the NEF 1230. By utilizing efficient load balancing techniques and capacity planning, energy usage in the NEF 1230 may be optimized.

Resource Management Configuration: By utilizing effective resource management within the NEF 1230, such as intelligent utilization of computing and network resources, the energy efficiency of the NEF 1230 may be improved. Thus, optimizing resource allocation, scaling, and usage may reduce the energy consumption of NEF 1230 and may thereby increase the energy efficiency of the NEF 1230.

Data Processing and Filtering Mechanism: The efficiency of data processing and filtering mechanisms employed by the NEF 1230 may affect its energy efficiency. By utilizing optimized algorithms and techniques for data processing, filtering, and aggregation, energy consumed during the data processing and filtering may be reduced, which may result in lower energy consumption and improved energy efficiency of the NEF 1230.

Security Mechanisms: The security mechanisms implemented in the NEF 1230 can impact its energy efficiency. For instance, encryption, authentication, and authorization processes when communicating with the trusted third party(s) require computational resources, which may affect the energy consumption of the NEF 1230. Thus, efficient security algorithms and optimized authentication mechanisms may reduce energy overhead and thereby improve the energy efficiency of the NEF 1230.

Protocol Optimization Mechanism: By optimizing protocols and data formats used by the NEF 1230, energy efficiency of the NEF 1230 may be improved. For instance, the efficient protocols can reduce the amount of data transmission and processing, resulting in lower energy consumption of the NEF 1230.

Operational States or Modes: By implementing sleep modes or low-power states during periods of inactivity energy efficiency of the NEF 1230 may be enhanced. The NEF 1230 can enter low-power modes when there are no active requests or data processing, thereby conserving energy.

It can be understood that the energy efficiency factors of the NEF 1230 may further include any other suitable energy efficiency factors which may directly and/or indirectly affect the energy efficiency of the NEF 1230, without departing from the scope of the present disclosure.

In view of the above, the at least one processor of the server node may, upon utilizing the EMF 1210, receive energy data from the plurality of network entities 1220 and/or the NEF 1230 (and/or from the OAM tool 1250), and may perform one or more operations of method 800 to process the received energy data and to perform one or more energy management operations for optimizing the energy efficiency of the NEF 1230, in a similar manner as described above with reference to use case 1 and use case 2. Subsequently, the energy information may be exposed to the trusted third party 1240 via the NEF 1230.

In this way, the energy information and data may be provided to one or more network entities or users in an energy-efficient manner. For example, energy information, such as the ratio of renewable energy involved in a dedicated network slice, may be provided to a trusted third party, on a periodic basis. Specifically, the ratio of renewable energy used for providing dedicated communication service to the trusted third party may be tracked over time and collated for reporting to the trusted third party. The reporting period may be defined, for example, monthly or yearly. In such cases, the server node may store, in one or more storage mediums (e.g., storage 620, database 730, etc.), the information related to the ratio of renewable energy used for providing dedicated communication service to the trusted third party and transmits the same information to the trusted third party on request or automatically based on the reporting period.

As another example, the server node may forward energy information (e.g., information related to energy consumption and level of energy efficiency) of one or more network entities to one or more UEs of one or more associated users. In this way, the energy information which may define the energy efficiency of the network system as a whole or individual network entity(s) may be provided to the associated user(s), and the user(s) may make informed decisions about their service providers and usage patterns. By way of example, a user may request live streaming content, for example, a live cricket match and as such, a level of energy efficiency of the network system in providing the requested content may be displayed on the UE of the user. The user may choose to continue watching the requested livestreaming content or not depending on the level of energy efficiency.

Example Reference Point Representation

The implementation of the EMF of the example embodiments is described above with reference to service-based architecture (SBA), which enables the decoupling of network functions, promotes service-oriented design, and facilitates flexible service deployment and orchestration. In general, SBA is based on a modular and distributed approach, where network functions are designed as self-contained services that communicate with each other through a service-based interface (SBI). As described above, the functionalities of the EMF of example embodiments may be provided to the network entities via a dedicated SBI, which is described herein as "Nemf" interface.

Figure 13:
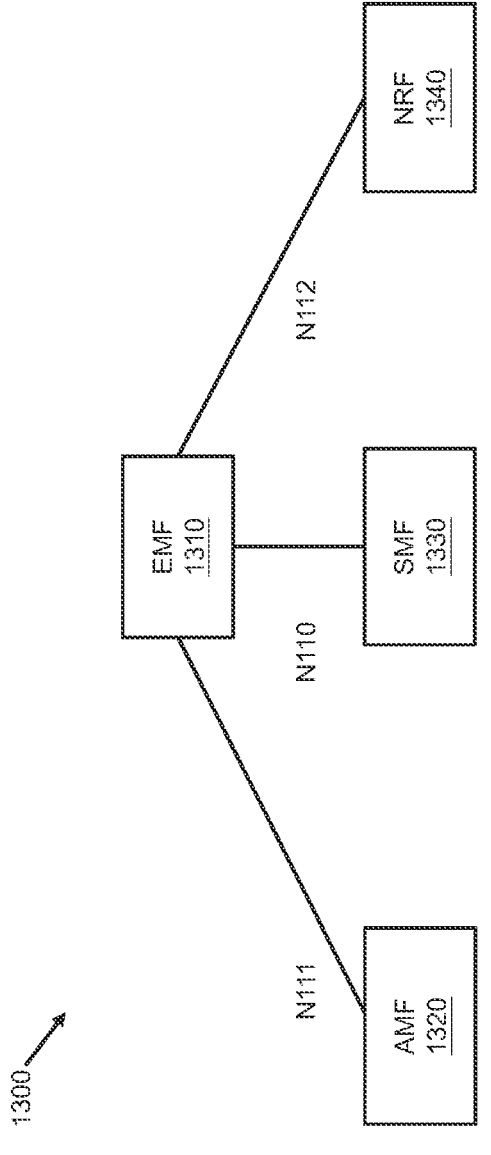
FIG. 13 illustrates a block diagram of an example reference point presentation of a network system with the EMF implemented therein, according to one or more embodiments.

According to embodiments, the EMF of example embodiments of the present disclosure may also be presented in a reference point representation for another view of the integration of the EMF in the network system. FIG. 13 illustrates a block diagram of an example reference point presentation 1300 of a network system with the EMF implemented therein, according to one or more embodiments. The EMF 1310, AMF 1320, SMF 1330, and NRF 1340 in FIG. 13 may be similar to those described above with reference to FIG. 1 to FIG. 12. Thus, redundant descriptions associated therewith may be omitted below for conciseness.

As illustrated in FIG. 13, with the integration of the EMF 1310, at least three new reference point representations may be introduced, namely: N110, N111, and N112. It can be understood that, in practice, the labeling of said three new reference point representations may be presented in any other suitable terms, without departing from the scope of the present disclosure.

It can also be understood that, in practice, the AMF 1320, the SMF 1330, and the NRF 1340 may be communicatively coupled to other network functions via other existing reference point representations (e.g., N1, N2, N3, N4, N6, N9, N11, N12, N14, N15, etc.), and the EMF 1310 may communicatively couple to said other network functions via the AMF 1320, the SMF 1330, and the NRF 1340.

The reference point representation 'N110' illustrates an interaction between the EMF 1310 and the SMF 1330. The reference point representation 'N110' enables the EMF 1310 to communicate with the SMF 1330 to thereby manage and control energy usage associated with the SMF 1330 (or any other network entity communicatively coupled to the EMF 1310 via the SMF 1330).

Similarly, the reference point representation 'N111' illustrates an interaction between the EMF 1310 and the AMF 1320. As such, the reference point representation 'N111' enables the EMF 1310 to communicate with the AMF 1320 to thereby manage and control energy usage associated with the AMF 1320 (or any other network entity communicatively coupled to the EMF 1310 via the AMF 1320). The reference point representation 'N112' illustrates an interaction between the EMF 1310 and the NRF 1340. The reference point representation 'N112' enables the EMF 1310 to communicate with the NRF 1340 to thereby manage and control energy usage associated with the NRF 1340 (or any other network entity communicatively coupled to the EMF 1310 via the NRF 1340).

In view of the above, the introduction of these new reference points N110, N111, and N112 will not only ensure the EMF of the present disclosure effectively integrates into the existing and future telecommunication network systems for managing energy consumption of the network entities, but also provide broad-based interaction with other key network entities (e.g., key network functions, etc.). This extensive interconnectivity is pivotal for the EMF to exert systemic influence, optimizing energy efficiency and sustainability across the whole network system (e.g., 5G network, etc.).

VARIOUS ASPECTS OF EMBODIMENTS

It is contemplated that the example embodiments described hereinabove with reference to FIG. 1 to FIG. 13 are merely examples of possible embodiments of the present disclosure, and are not intended to limit or restrict the scope of the present disclosure.

Specifically, the foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to an apparatus or a device (e.g., server node, etc.), a system, a method, and/or a computer-readable medium at any possible technical detail level of integration. Further, one or more of the above components described above may be implemented as instructions stored on a computer-readable medium and executable by at least one processor (and/or may include at least one processor). The computer-readable medium may include a computer-readable non-transitory storage medium (or media) having computer-readable program instructions thereon for causing a processor to carry out operations.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages.

The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects or operations.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer-readable media according to various embodiments. In this regard, each block in the flowchart or block diagrams may represent a module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it is understood that software and hardware may be designed to implement the systems and/or methods based on the description herein.

In view of the above, various further respective aspects and features of embodiments of the present disclosure may be defined by the following items:

1 Item [1]: An apparatus including: an energy management function (EMF) for a telecommunication network. The apparatus may be configured to execute instructions for implementing the EMF to: receive, from at least one network entity, one or more energy data associated with the at least one network entity; process the one or more energy data to produce a level of energy efficiency associated with the at least one network entity; and perform, based on the level of energy efficiency, one or more operations for managing energy usage of the at least one network entity.

Item [2]: The apparatus according to item [1], wherein the one or more operations for managing the energy usage of the at least one network entity may include one or more of: sharing the information of the level of energy efficiency to one or more users; sharing the information of the level of energy efficiency to one or more trusted third parties; managing one or more resources associated with the at least one network entity; managing one or more operations associated with the at least one network entity; managing a state of the at least one network entity; and managing one or more energy criteria associated with the at least one network entity.

Item [3]: The apparatus according to any one of items [1]-[2], wherein the EMF may be a core network function of the telecommunication network, and wherein the at least one network entity may include one or more of: at least one network function, at least one user equipment, and at least one access network.

Item [4]: The apparatus according to item [3], wherein the at least one network functions may include one or more of: a Network Data Analytic Function (NWDAF), an Access and Mobility Management Function (AMF), a Session Management Function (SMF), a Network Repository Function (NRF), and a Network Exposure Function (NEF).

Item [5]: The apparatus according to any one of items [1]-[4], wherein the apparatus may be configured to execute the instructions to receive the one or more energy data from the at least one network entity via a Service-Based Interface (SBI) associated with the EMF, wherein the EMF may expose energy management functionalities associated therewith via the SBI.

Item [6]: The apparatus according to any one of items [1]-[5], wherein the apparatus may be configured to execute the instructions to receive the one or more energy data from the at least one network entity via at least one interface defined by at least one reference point representation.

Item [7]: The apparatus according to any one of items [1]-[6], wherein the one or more energy data may include one or more of: energy consumption information, energy profile, energy metrics, network information, component status, predictive data, and one or more energy efficiency factors.

Item [8]: The apparatus according to item [7], wherein the predictive data may include one or more of: prediction of future energy usage pattern and a forecast of network traffic.

Item [9]: The apparatus according to any one of items [7]-[8], wherein the one or more energy efficiency factors may include one or more of: network traffic load, network topology, resource management, operational modes, routing and handover algorithms, processing and computational load, network protocol configuration, data compression configuration and protocol, data routing configuration, data storage and retrieval mechanism, data replication and distribution mechanism, data synchronization mechanism, data processing and filtering mechanism, and security mechanism.

Item [10]: The apparatus according to any one of items [1]-[9], wherein the apparatus may include an edge server.

Item [11]: A method including: receiving, from at least one network entity, one or more energy data associated with the at least one network entity; processing the one or more energy data to produce a level of energy efficiency associated with the at least one network entity; and performing, based on the level of energy efficiency, one or more operations for managing energy usage of the at least one network entity, wherein the method is implemented by an energy management function (EMF) for a telecommunication network.

Item [12]: The method according to item [11], wherein the one or more operations for managing the energy usage of the at least one network entity may include one or more of: sharing the information of the level of energy efficiency to one or more users; sharing the information of the level of energy efficiency to one or more trusted third parties; managing one or more resources associated with the at least one network entity; managing one or more operations associated with the at least one network entity; managing a state of the at least one network entity; and managing one or more energy criteria associated with the at least one network entity Item [13]: The method according to any one of items [11]-[12], wherein the EMF may be a core network function of the telecommunication network, and wherein the at least one network entity may include one or more of: at least one network function, at least one user equipment, and at least one access network.

Item [14]: The method according to item [13], wherein the at least one network function may include one or more of: a Network Data Analytic Function (NWDAF), an Access and Mobility Management Function (AMF), a Session Management Function (SMF), a Network Repository Function (NRF), and a Network Exposure Function (NEF).

Item [15]: The method according to any one of items [11]-[14], wherein the receiving the one or more energy data may include: receiving the one or more energy data from the at least one network entity via a Service-Based Interface (SBI) associated with the EMF, wherein the EMF may expose energy management functionalities associated therewith via the SBI.

Item [16]: The method according to any one of items [11]-[15], wherein the receiving the one or more energy data may include: receiving the one or more energy data from the at least one network entity via at least one interface defined by at least one reference point representation.

Item [17]: The method according to any one of items [11]-[16], wherein the one or more energy data may include one or more of: energy consumption information, energy profile, energy metrics, network information, component status, predictive data, and one or more energy efficiency factors.

Item [18]: The method according to item [17], wherein the predictive data may include one or more of: prediction of future energy usage pattern and a forecast of network traffic.

Item [19]: The method according to any one of items [17]-[18], wherein the one or more energy efficiency factors may include one or more of: network traffic load, network topology, resource management, operational modes, routing and handover algorithms, processing and computational load, network protocol configuration, data compression configuration and protocol, data routing configuration, data storage and retrieval mechanism, data replication and distribution mechanism, data synchronization mechanism, data processing and filtering mechanism, and security mechanism.

Item [20]: A non-transitory computer-readable recording medium having recorded thereon instructions for implementing an energy management function (EMF) for a telecommunication network. The instructions may be executable by an apparatus to cause the apparatus to perform a method including: receiving, from at least one network entity, one or more energy data associated with the at least one network entity; processing the one or more energy data to produce a level of energy efficiency associated with the at least one network entity; and performing, based on the level of energy efficiency, one or more operations for managing energy usage of the at least one network entity.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. An apparatus comprising:
an energy management function (EMF) for a telecommunication network, wherein the apparatus is configured to execute instructions for implementing the EMF to:
    receive, from at least one network entity, one or more energy data associated with the at least one network entity;
    process the one or more energy data to produce a level of energy efficiency associated with the at least one network entity; and
    perform, based on the level of energy efficiency, one or more operations for managing energy usage of the at least one network entity,
    wherein the EMF is a distinct and dedicated core network function, dedicated to energy management functionalities, comprising at least one dedicated Service-Based Interface (SBI) for exposing the energy management functionalities associated therewith to one or more other dedicated core network functions.

2. The apparatus according to claim 1, wherein the one or more operations for managing the energy usage of the at least one network entity comprises one or more of:
    sharing the information of the level of energy efficiency to one or more users;
    sharing the information of the level of energy efficiency to one or more trusted third parties;
    managing one or more resources associated with the at least one network entity;
    managing one or more operations associated with the at least one network entity;
    managing a state of the at least one network entity; and
    managing one or more energy criteria associated with the at least one network entity.

3. The apparatus according to claim 1,
    wherein the at least one network entity comprises one or more of: at least one network function, at least one user equipment, and at least one access network.

4. The apparatus according to claim 3, wherein the at least one network function comprises one or more of:
    a Network Data Analytic Function (NWDAF), an Access and Mobility Management Function (AMF), a Session Management Function (SMF), a Network Repository Function (NRF), and a Network Exposure Function (NEF).

5. The apparatus according to claim 1,
    wherein the apparatus is configured to execute the instructions to receive the one or more energy data from the at least one network entity via at least one interface defined by at least one reference point representation.

6. The apparatus according to claim 1, wherein the one or more energy data comprises one or more of:
    energy consumption information, energy profile, energy metrics, network information, component status, predictive data, and one or more energy efficiency factors.

7. The apparatus according to claim 6, wherein the predictive data comprises one or more of:
    prediction of future energy usage pattern and a forecast of network traffic.

8. The apparatus according to claim 6, wherein the one or more energy efficiency factors comprises one or more of:
    network traffic load, network topology, resource management, operational modes, routing and handover algorithms, processing and computational load, network protocol configuration, data compression configuration and protocol, data routing configuration, data storage and retrieval mechanism, data replication and distribution mechanism, data synchronization mechanism, data processing and filtering mechanism, and security mechanism.

9. The apparatus according to claim 1, wherein the apparatus comprises an edge server.

10. The apparatus according to claim 1, wherein the EMF is distinct from Access and Mobility Management Function (AMF), Session Management Function (SMF), Network Data Analytic Function (NWDAF), Network Repository Function (NRF), Network Exposure Function (NEF), User Plane Function (UPF), Policy Control Function (PCF), Unified Data Management (UDM), Application Function (AF), Network Slice Selection Function (NSSF), Network Slice Specific Authentication and Authorization Function (NS-SAAF), Authentication Server Function (AUSF), Policy Control Function (PCF), Unified Data Management (UDM), Service Communication Proxy (SCP), Network Slice Admission Control Function (NSACF), and Edge Application Server Discovery Function (EASDF).

11. The apparatus according to claim 1, wherein the at least one network entity is a Radio Access Network (RAN) base station entity.

12. A method comprising:
    receiving, from at least one network entity, one or more energy data associated with the at least one network entity;
    processing the one or more energy data to produce a level of energy efficiency associated with the at least one network entity; and
    performing, based on the level of energy efficiency, one or more operations for managing energy usage of the at least one network entity,
    wherein the method is implemented by an energy management function (EMF) for a telecommunication network, and
    wherein the EMF is a distinct and dedicated core network function, dedicated to energy management functionalities, comprising at least one dedicated Service-Based Interface (SBI) for exposing the energy management functionalities associated therewith to one or more other dedicated core network functions.

13. The method according to claim 12, wherein the one or more operations for managing the energy usage of the at least one network entity comprises one or more of:

sharing the information of the level of energy efficiency to one or more users;

sharing the information of the level of energy efficiency to one or more trusted third parties;

managing one or more resources associated with the at least one network entity;

managing one or more operations associated with the at least one network entity;

managing a state of the at least one network entity; and managing one or more energy criteria associated with the at least one network entity.

14. The method according to claim 12, wherein the at least one network entity comprises one or more of: at least one network function, at least one user equipment, and at least one access network.

15. The method according to claim 14, wherein the at least one network function comprises one or more of:

a Network Data Analytic Function (NWDAF), an Access and Mobility Management Function (AMF), a Session Management Function (SMF), a Network Repository Function (NRF), and a Network Exposure Function (NEF).

16. The method according to claim 12, wherein the receiving the one or more energy data comprises:

receiving the one or more energy data from the at least one network entity via at least one interface defined by at least one reference point representation.

17. The method according to claim 12, wherein the one or more energy data comprises one or more of:

energy consumption information, energy profile, energy metrics, network information, component status, predictive data, and one or more energy efficiency factors.

18. The method according to claim 17, wherein the predictive data comprises one or more of:

prediction of future energy usage pattern and a forecast of network traffic.

19. The method according to claim 17, wherein the one or more energy efficiency factors comprises one or more of:

network traffic load, network topology, resource management, operational modes, routing and handover algorithms, processing and computational load, network protocol configuration, data compression configuration and protocol, data routing configuration, data storage and retrieval mechanism, data replication and distribution mechanism, data synchronization mechanism, data processing and filtering mechanism, and security mechanism.

20. A non-transitory computer-readable recording medium having recorded thereon instructions for implementing an energy management function (EMF) for a telecommunication network, the instructions are executable by an apparatus to cause the apparatus to perform a method comprising:

receiving, by the EMF from at least one network entity, one or more energy data associated with the at least one network entity;

processing the one or more energy data to produce a level of energy efficiency associated with the at least one network entity; and performing, based on the level of energy efficiency, one or more operations for managing energy usage of the at least one network entity, wherein the EMF is a distinct and dedicated core network function, dedicated to energy management functionalities, comprising at least one dedicated Service-Based Interface (SBI) for exposing the energy management functionalities associated therewith to one or more other dedicated core network functions.

* * * * *